(12) United States Patent
Takaishi

(10) Patent No.: US 7,075,747 B2
(45) Date of Patent: Jul. 11, 2006

(54) HEAD POSITION CONTROL METHOD AND DISK DEVICE

(75) Inventor: Kazuhiko Takaishi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 96 days.

(21) Appl. No.: 10/449,525

(22) Filed: May 30, 2003

(65) Prior Publication Data

US 2004/0001273 A1 Jan. 1, 2004

(30) Foreign Application Priority Data

Jul. 1, 2002 (JP) .............................. 2002-192366

(51) Int. Cl.
*G11B 5/596* (2006.01)

(52) U.S. Cl. ................... 360/77.04; 360/63; 360/78.04

(58) Field of Classification Search .................. 360/29, 360/47, 51, 63, 76, 75, 69, 77.08, 61, 77.04, 360/78.04
See application file for complete search history.

(56) References Cited

U.S. PATENT DOCUMENTS

| 5,784,220 | A | | 7/1998 | Nishimura et al. | ...... 360/78.14 |
| 5,835,299 | A | | 11/1998 | Lee et al. | ...................... 360/76 |
| 5,859,742 | A | * | 1/1999 | Takaishi | ................... 360/78.01 |
| 5,943,179 | A | | 8/1999 | Fukushima | ............... 360/77.04 |
| 5,969,895 | A | | 10/1999 | Ueda et al. | ..................... 360/61 |
| 6,067,206 | A | | 5/2000 | Hull et al. | ............... 360/77.08 |
| 6,710,957 | B1 | * | 3/2004 | Nakasato | ..................... 360/51 |
| 2001/0013984 | A1 | | 8/2001 | Takaishi | |
| 2001/0022702 | A1 | | 9/2001 | Takaishi | |
| 2002/0060867 | A1 | | 5/2002 | Enokida et al. | ............... 360/31 |

FOREIGN PATENT DOCUMENTS

| EP | 673 033 | 9/1995 |
| JP | 9-128915 | 5/1997 |
| JP | 10-97772 | 4/1998 |
| JP | 2000-311454 | 11/2000 |
| JP | 3226499 | 8/2001 |
| JP | 2001-266454 | 9/2001 |

OTHER PUBLICATIONS

"Method, System and Interface for Mapping Tracks in No-Id Disk Drives;" *IBM Tech. Disclosure Bulletin*; vol. 38, No. 12, Dec. 1994; pp. 275-277.

* cited by examiner

*Primary Examiner*—Wayne Young
*Assistant Examiner*—Jason Olson
(74) *Attorney, Agent, or Firm*—Greer, Burns & Crain, Ltd.

(57) ABSTRACT

A disk device that has displacement of servo signals in the circumference direction and radius direction between a plurality of disks, prevents a drop in performance due to the displacement when the heads are switched. To deal with the displacement in the circumference direction, the sector numbers on the disk are converted by a table for each head. Also the servo gate time is corrected by the table according to the eccentricity of the disk, so the servo signal detection accuracy improves. Also to deal with the displacement in the radius direction, the track numbers on the disk are converted by the table using the difference value based on the reference head.

22 Claims, 39 Drawing Sheets

FIG. 9      64

| AVERAGE VALUE OF SAMPLE PERIOD DEVIATION OF HEAD 0, ZONE 0 |
|---|
| Cos COMPONENT OF SAMPLE PERIOD DEVIATION OF HEAD 0, ZONE 0 |
| Sin COMPONENT OF SAMPLE PERIOD DEVIATION OF HEAD 0, ZONE 0 |
| AVERAGE VALUE OF SAMPLE PERIOD DEVIATION OF HEAD 0, ZONE 1 |
| Cos COMPONENT OF SAMPLE PERIOD DEVIATION OF HEAD 0, ZONE 1 |
| Sin COMPONENT OF SAMPLE PERIOD DEVIATION OF HEAD 0, ZONE 1 |
| . . . |
| AVERAGE VALUE OF SAMPLE PERIOD DEVIATION OF HEAD 0, ZONE M |
| Cos COMPONENT OF SAMPLE PERIOD DEVIATION OF HEAD 0, ZONE M |
| Sin COMPONENT OF SAMPLE PERIOD DEVIATION OF HEAD 0, ZONE M |
| AVERAGE VALUE OF SAMPLE PERIOD DEVIATION OF HEAD 1, ZONE 0 |
| Cos COMPONENT OF SAMPLE PERIOD DEVIATION OF HEAD 1, ZONE 0 |
| Sin COMPONENT OF SAMPLE PERIOD DEVIATION OF HEAD 1, ZONE 0 |
| . . . |

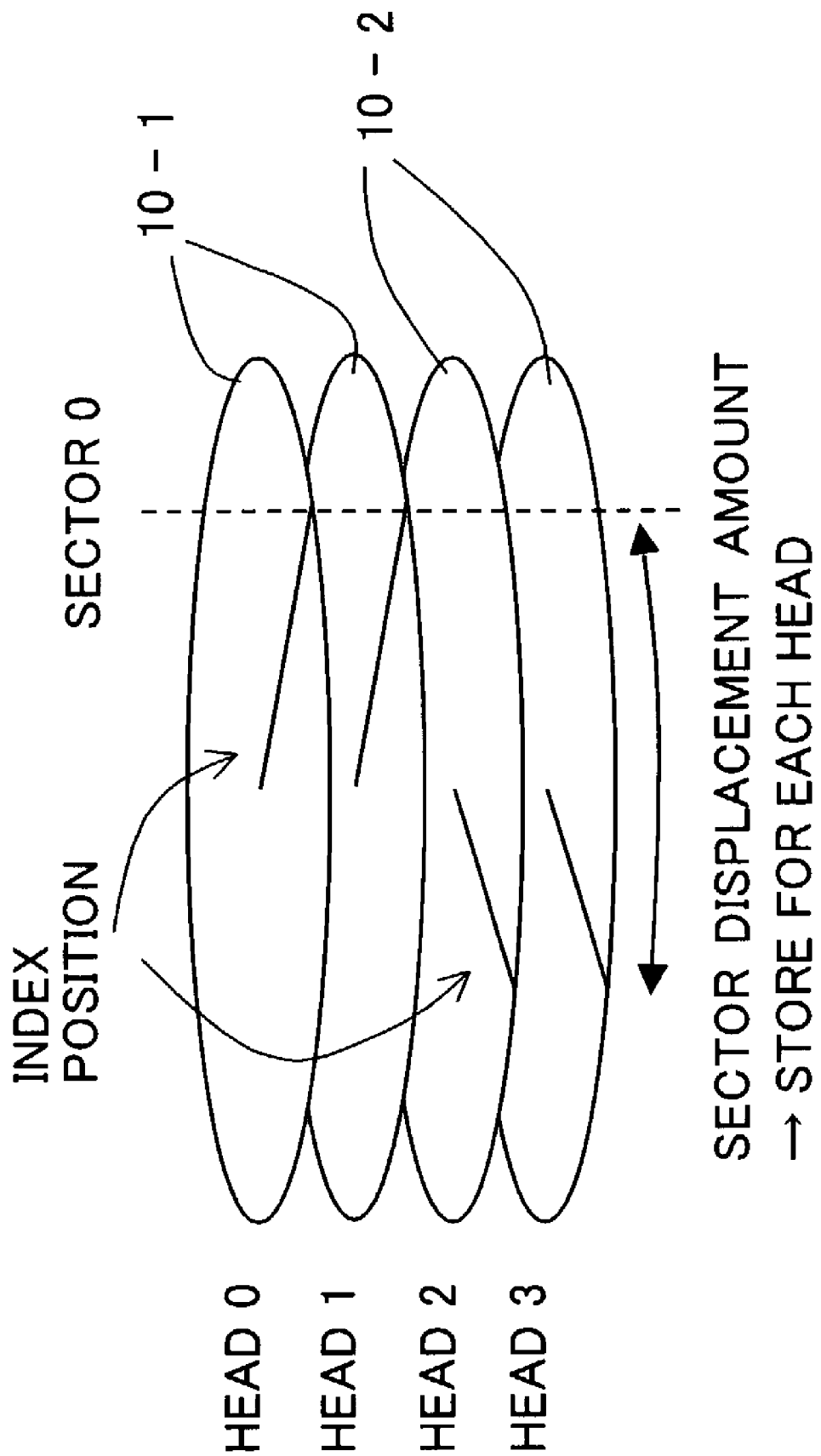

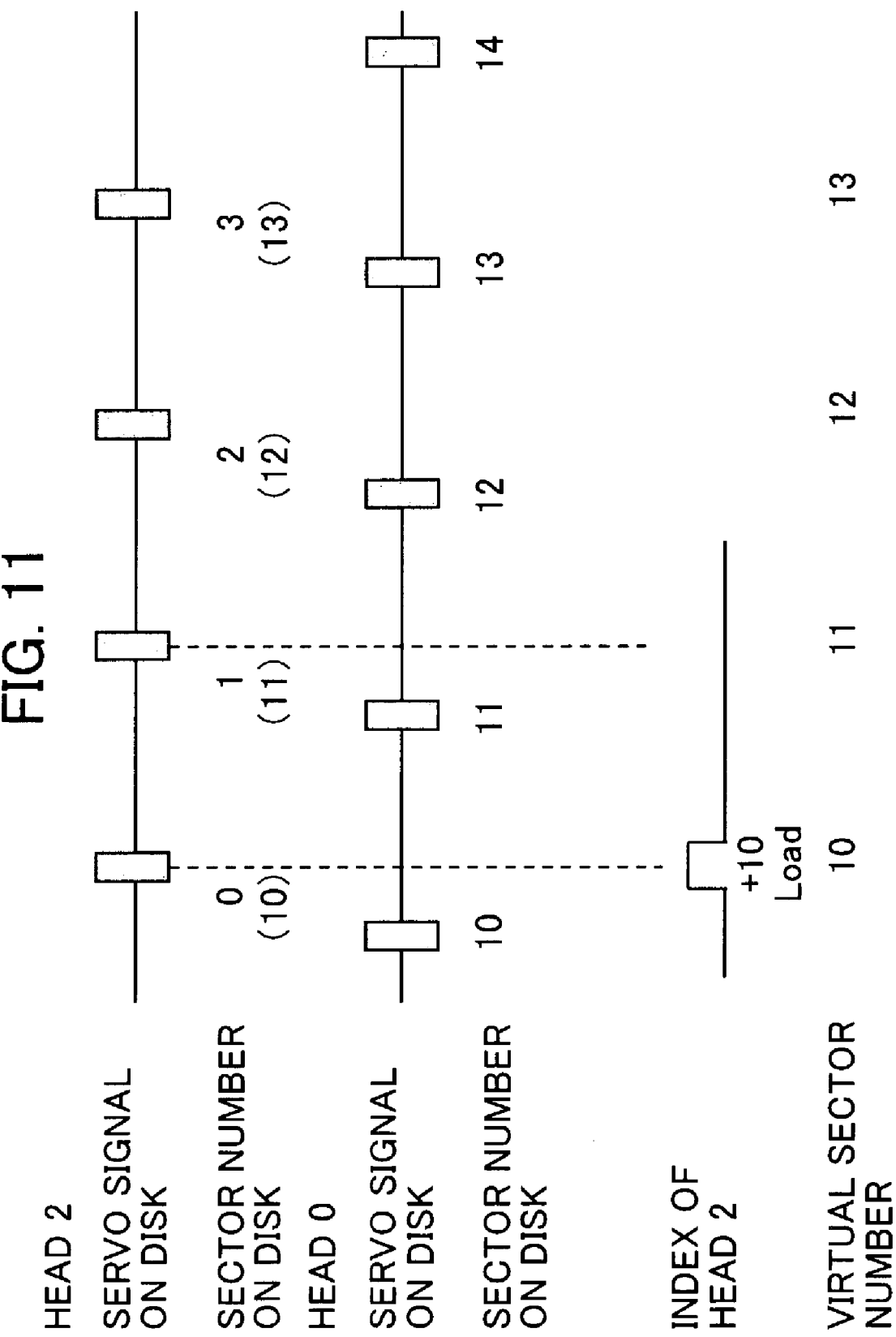

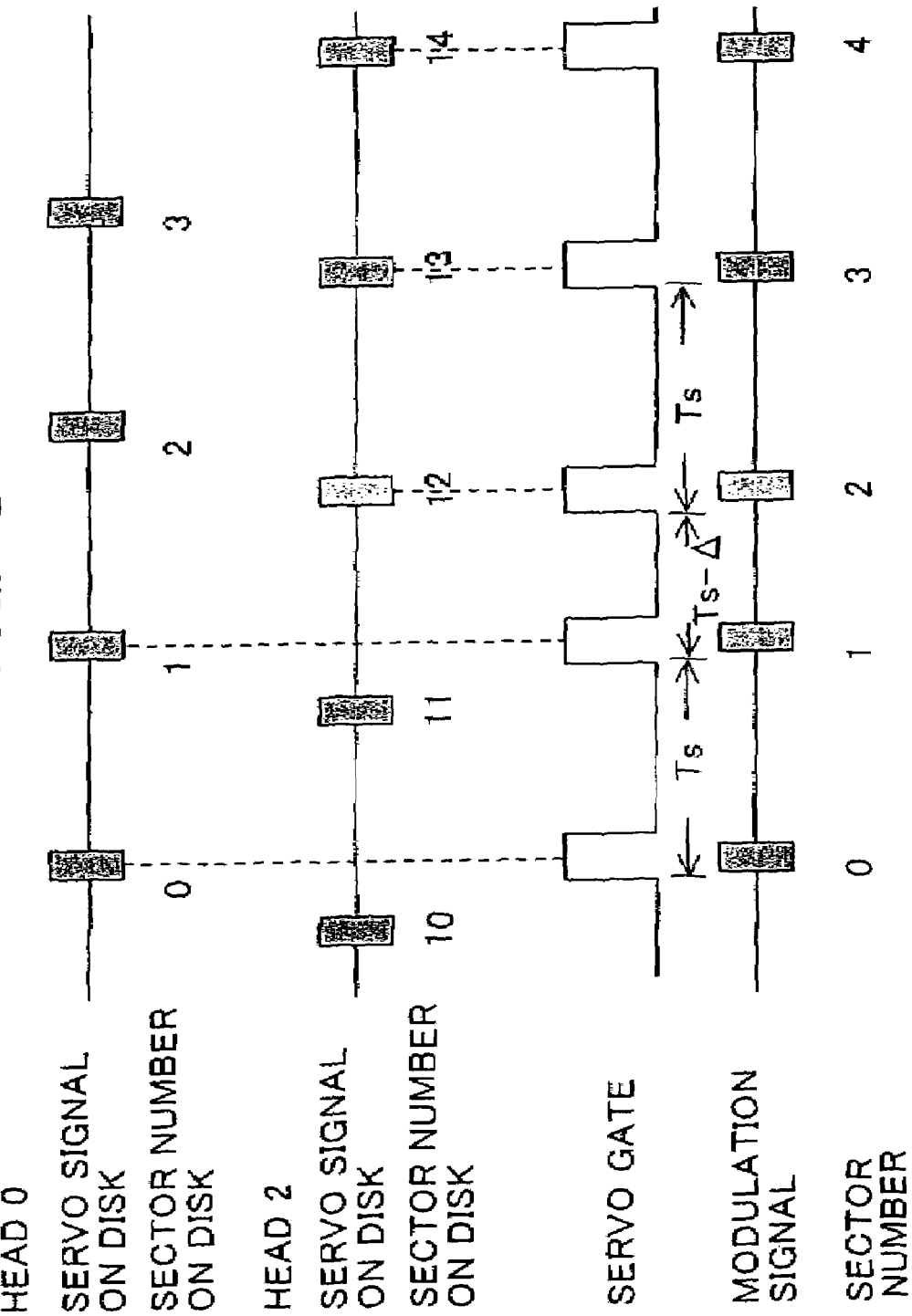

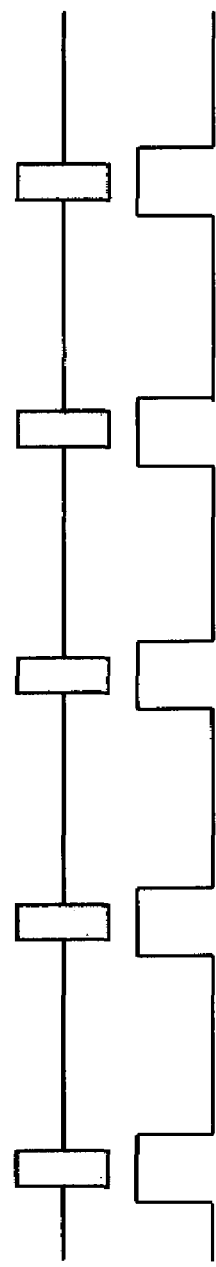
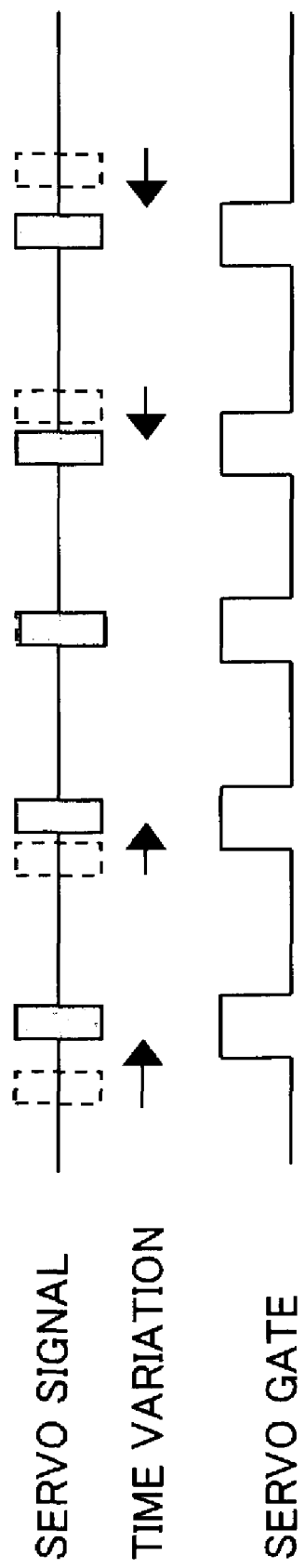
FIG. 14

FIG. 17
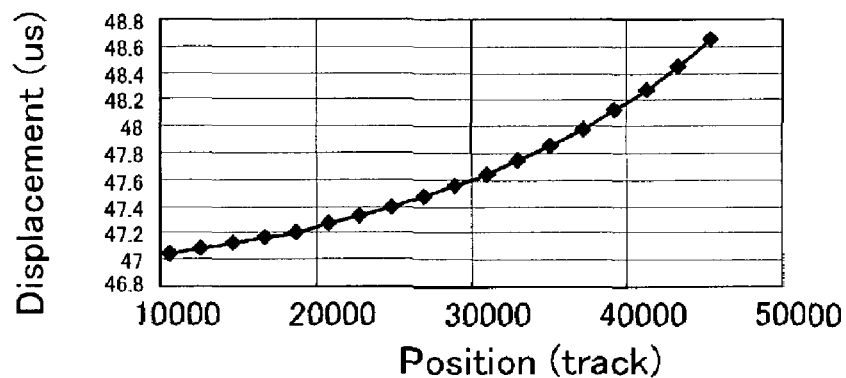
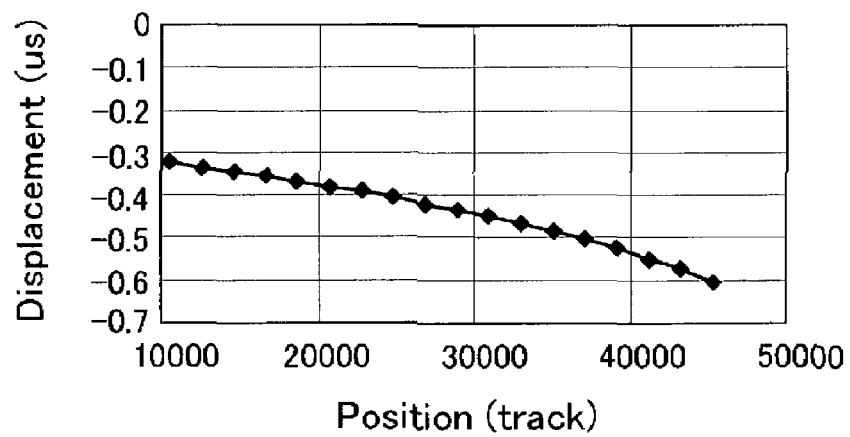
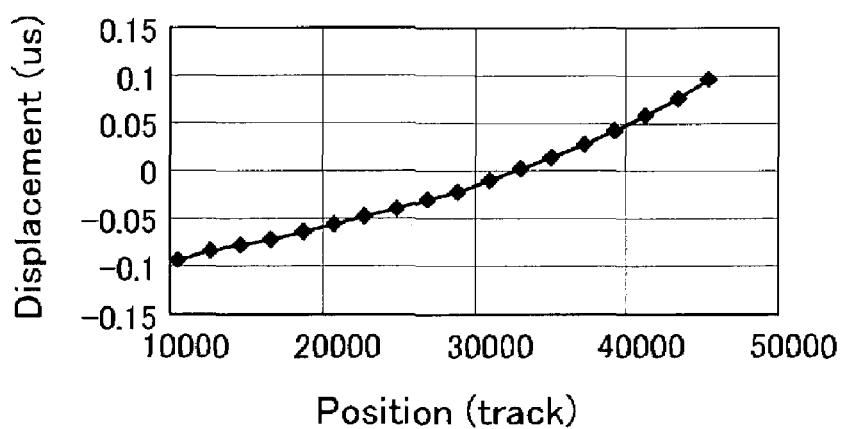

FIG. 26

| 46 |
|---|
| COMMON TRACK NUMBER DISPLACEMENT AMOUNT FOR ALL HEADS |
| TRACK NUMBER DISPLACEMENT AMOUNT OF HEAD 0, ZONE 0 |
| TRACK NUMBER DISPLACEMENT AMOUNT OF HEAD 0, ZONE 1 |
| ... |
| TRACK NUMBER DISPLACEMENT AMOUNT OF HEAD 1, ZONE 0 |
| TRACK NUMBER DISPLACEMENT AMOUNT OF HEAD 1, ZONE 1 |
| ... |

FIG. 34
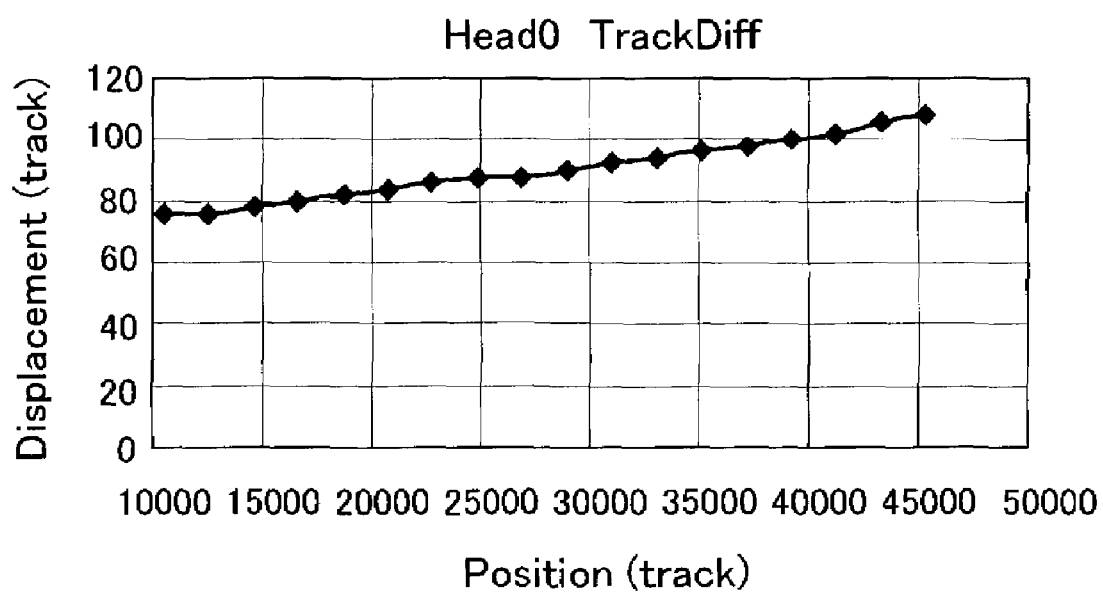
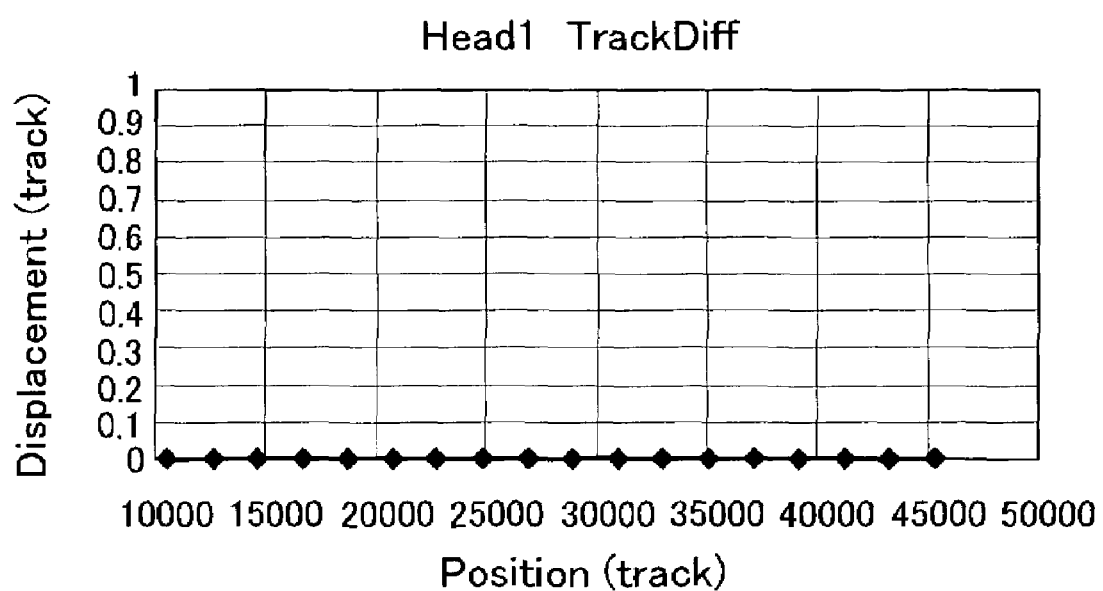

FIG. 35
Head2 TrackDiff
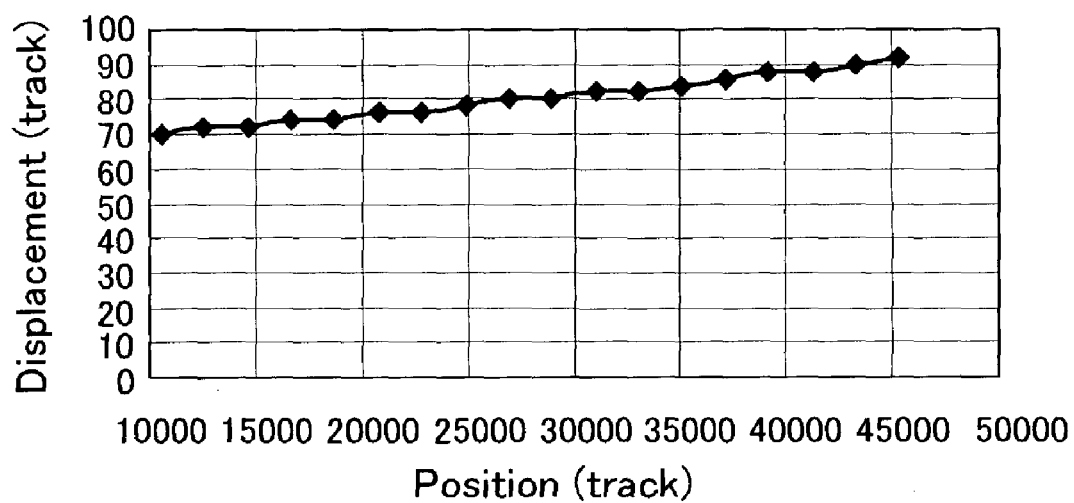
Head3 TrackDiff
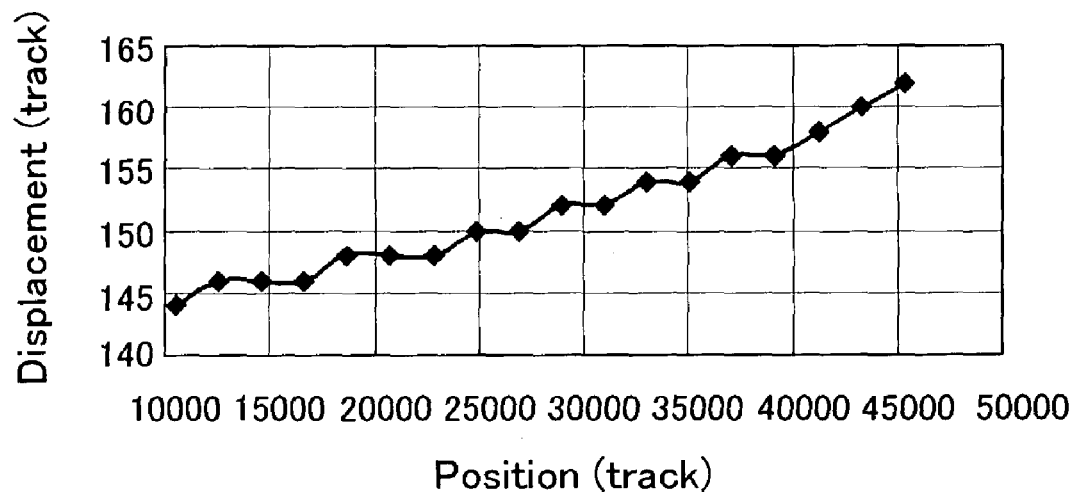

HEAD POSITION CONTROL METHOD AND DISK DEVICE

BACKGROUND OF THE INVENTION

1. Field of the Invention

The present invention relates to a head position control method and a disk device for controlling the position of a read head or a read/write head on a rotating storage disk, and more particularly to a head position control method in a disk device having two or more heads of which each head corresponds to each one of the plurality of disk faces, and the disk device thereof.

2. Description of the Related Art

Disk devices using storage disks are widely used as storage devices. FIG. 36 is a diagram depicting the configuration of a conventional storage disk device. As FIG. 36 shows, the disk device is comprised of a disk 94 for storing data, a spindle motor 96 for rotating the disk 94, a head 90 for recording and regenerating information on the disk 94, and an actuator 92 for moving the head 90 to a target position. Typical disk devices are magnetic disk devices (HDD: Hard Disk Drive) and optical disk devices (DVD and MO).

In this disk device, position signals for detecting the position of the head 90 (position in track direction and radius direction) have been recorded on the disk 94. For example, in the magnetic disk 94, position signals 100 have been recorded for each sector 102 on a same circumference (track) of the magnetic disk, as shown in FIG. 38. The position signal has a track information which indicates the position in the radius direction of the disk 94, and sector information which indicates the position in the circumference direction of the disk 94.

The head 90 can detect the position of the head 90 in the radius direction and circumference direction by reading this position signal 100. Such a disk device has one head, and a displacement of the position signals between disks or between the disk faces does not occur if the device uses only one face of the disk.

However, if the disk device has two or more heads, and uses a plurality of disk faces (front and back of a disk, or a plurality of disks), a displacement of position signals becomes a problem, so this device is based on the following implicit assumption.

In other words, the track numbers of the position signals recorded on the disk 94 and the number of the position signals are common for all the heads. This means that the start position and end position of the data area in the radius direction of the disk are common. Also between heads, there is no displacement of the position signals in the radius direction, and between heads there is no displacement in the circumference direction.

However, if there is a displacement in the radius direction and circumference direction between the heads, when a first head is switched to a second head, the second head requests a control mode which is different from the first head to a same actuator.

Also after the device is assembled, the positional relationship of the position signals may become different, due to the displacement in the assembly of the disk after shipment from the factory. However, there are no devices where disks are displaced prior to this. So a position demodulation device or position demodulation method for such a device has been constituted based on this implicit assumption.

To implement such an implicit assumption, after the disk device is assembled, that is after the disk 94 is installed on the spindle motor 96 and the head 90 and the actuator 92 are mounted, servo track write (STW), which is an operation for recording servo signals (position signals) on the disk 94 by the head 90, is performed. In the present description, this conventionally performed STW method is called "conventional STW". In other words, the above mentioned assumption is implemented by writing position signals after the positional relationships of the plurality of target heads and disks are fixed.

On the other hand, there is a method of performing STW (writing position signals on the disk 94) before assembly of the device. Since the disks are handled as a single disk, this method is called "media-level STW". In the case of an HDD where this single disk STW method is applied, the above implicit assumption is not established.

In other words, when disks where position signals have been written in advance are installed in the disk device, the positional relationship between the position signals on each face of the disks and the head shift. One of these displacements is a displacement in the circumference direction. In this case, the detection timing of the servo signals and circumference positions of the servo sectors become different among each face of the disks. This influences the position demodulation circuit as a time difference.

The other displacement is a displacement in the radius direction. For this, it is necessary to adjust the data recording range for each device by minimizing the displacement between the disks.

FIG. 39 shows this displacement of position signals. This shows the status when two disks, 94-1 and 94-2, for which STW has been completed, are installed on the spindle motor 96. The eccentricity amount is the difference between the rotation center 98 of the spindle motor 96 and the rotation centers of the disks 94-1 and 94-2 during STW. Also servo signals are displaced in the radius direction and circumference direction between the disks 94-1 and 94-2.

FIG. 37 shows the status of the displacement of the magnetic heads 90-1 and 90-2. Since it is impossible to perfectly install a plurality of magnetic head 90-1 and 90-2 without a displacement, the displacement appears as a displacement in the radius direction and circumference direction.

Since the displacements shown in FIG. 37 and FIG. 39 occurs in this way, the displacement must be handled when the heads are switched, and various displacement correction technologies have been proposed. As such a prior art for correcting the displacement of servo signals between heads, "Head positioning control method of magnetic disk device and device thereof" was proposed in Japanese Patent No. 3,226,499 (date of registration: Aug. 31, 2001).

This proposal discloses a method for measuring and saving the difference of the detection times of the servo signals of each head, and correcting the servo detection gate time with the saved time difference. This method is effective when the displacement of the servo signals in the circumference direction is small, just like the case when the positional signals are simultaneously recorded on the front and back of the disk.

The necessity of a displacement correction in the radius direction is based on the technology for using the data area in the track direction at the maximum considering eccentricity. In other words, in a conventional device, track numbers detected by the head are directly used for positioning control. For example, when the position control circuit receives a seek instruction to command positioning to the No. 10000 track, the position control circuit positions the head to a position where the track number No. 10000 on the disk can be read.

With the above method, however, in some cases the area for recording and regenerating data becomes small. This is the case when disks cannot be replaced, and the servo signals were recorded on the disks before the device is assembled. In this case, the range where the actuator can be moved in the device and the range of the track numbers on the disk differ, depending on the difference of the individual disk devices and the difference of individual servo track writers (hereafter STW).

For example, the range is 5000 to 40000 for the disk device 1, and 7000 to 42000 for the disk device 2. In such a case, according to the conventional method, the range of the track numbers to be used for recording data is set to be narrow, considering the variation of all the devices. In the previous example, 7000 to 40000 is set.

To expand this range of the track numbers, Japanese Patent Laid-Open No. 2001-266454, "Head positioning control method of disk device and disk device" proposes to convert the track numbers instructed from the host device for each head and for each zone, so as to make the data range of each disk variable.

In such a device which expands the range of the track numbers, the above mentioned displacement of the servo signals in the radius direction influences the conversion of the track numbers.

These displacements of position signals in the circumference direction between disks or between disk faces can be solved by a conventional method, in the case of a device where the displacement of the position signals is small. However, if the displacement in the circumference direction between disks or between disk faces is large, as described in FIG. 39, the conventional method becomes a cause of dropping performance when the heads are switched.

At first, conventionally values detected by the head (sector positions) are directly used for the positions in the circumference direction. In other words, if information with the sector number No. 0 is detected from the disk, the sector number is regarded as No. 0. Or if an index signal is detected, the sector number is regarded as 0. This processing method is the same even if a device, where a plurality of disks are mounted, is used.

This method is effective because of the premise that the positions of the sector numbers in the circumference direction are aligned with all the heads when the servo track write (hereafter STW) is performed. In other words, the program or circuits of the device are constituted using this implicit assumption.

For the case when the positions in the circumference direction are displaced, a method called "staggered sector" is used. For this method as well, all the displacement amounts of the sector numbers between heads are the same among the same type of devices, since there is no difference depending on an individual device. For example, it is impossible that the displacement reaches 100 sectors. The position demodulation based on this implicit assumption is effective, because servo signals are recorded by a conventional STW method.

On the other hand, a method for transferring magnetic patterns by a magnetic transfer method or thermo-magnetic transfer method, and recording servo signals on the front and back of one disk has been proposed. For example, this method is proposed in IEEE Transactions on Magnetics, Vol. 37, No. 4, 2001, "Demodulation of Servo Track Signal Printed with a Lithographically Patterned Magnetic Disk", (T. Ishida, et al). Even if a pattern is transferred to the front and back of one disk, it is extremely difficult to accurately align the positions of the servo signals.

The same problem also occurs in the case of recording servo signals externally and then the disk is installed in the device, such as with single disk STW. When the number of sectors in a track is increased to 300 sectors or 500 sectors, for example, it is possible that a dislocation in the circumference direction between the heads of the device for recording servo signals and a dislocation between the heads of the device exceed the distance equivalent to one sector.

Such a problem is more conspicuous for a disk device with two or more disks. Dislocation is a problem even on the front and back of one disk, but if two disks are used, a dislocation generated at installing the disks is added, which causes more of a dislocation between heads.

To correct such a dislocation of sectors, marks are drawn on the disk and the position must be adjusted such that the marks are accurately matched between disks when the servo signals are recorded and when the disks are mounted on the device. However, adding such a manufacturing step increases the manufacturing time and the manufacturing cost. Even if marks are drawn, the above mentioned mechanical dislocation cannot be avoided, so it is difficult to 100% match the servo signals and the sector numbers among a plurality of disks.

Therefore this problem could not be effectively handled in prior art. So if prior art is used, processing to resynchronize with the sector numbers on the disk is required each time the heads are switched.

This influence leads to an increase in wait time for recording and regenerating data. For example, in a device which does not have a dislocation, the sector numbers are continuous. If the heads are switched with a sample where the sector number is 0 with the head 0, the sector number becomes 1 with the head 2 in the next sample.

In the case of a device with a dislocation, on the other hand, the sector number shifts to sector number 10, for example, if the heads are switched. And the dislocation amount differs depending on the individual device. In such a case, problems occur when data is recorded and regenerated. In a conventional device, the premise is that sector numbers between the heads are aligned. So when the data is recorded and regenerated, an LBA (Logical Block Address) is assigned based on this assumption.

If the dislocation amount is different depending on the individual device, a wait time occurs until the position of the head reaches an expected position of the circumference direction. Therefore time for recording/regenerating delays. And this wait time differs depending on the individual device. This causes a problem where the time until recording/regenerating data becomes long, that is, the processing performance for recording/regenerating data drops.

Secondly, in the case of the above mentioned prior art, when a dislocation in the radius direction is corrected, an effective track number conversion method and a measurement method for determining the conversion values are not provided when a plurality of disks are used. Therefore prior art has a problem in terms of application to a plurality of disks.

SUMMARY OF THE INVENTION

With the foregoing in view, it is an object of the present invention to provide a head position control method and a disk device for effectively correcting a displacement of the position signals in the circumference direction between disks and between disk faces.

It is another object of the present invention to provide a head position control method and a disk device for making the resynchronizing operation of the sector numbers unnecessary when the heads are switched, and making high-velocity access possible, even if the displacement of the position signals in the circumference direction is large between disks and between disk faces.

It is still another object of the present invention to provide a head position control method and a disk device for correcting the servo gate at high-velocity when the heads are switched, even if the displacement of the position signals in the circumference direction is large between disks and between disk faces.

It is still another object of the present invention to provide a head position control method and a disk device for effectively correcting the displacement of position signals in the radius direction between disks and between disk faces.

It is still another object of the present invention to provide a head position control method and a disk device for easily converting track numbers, even if the displacement of the position signals in the circumference direction is large between disks and between disk faces.

To achieve these objects, a head position control method of the present invention is a head position control method for a disk device which has a plurality of heads for at least reading different faces of a disk where servo signals for detecting the position of the head are recorded, comprising a step of switching a first head of the plurality of heads to another head, a step of extracting a signal indicating a position in the circumference direction of the disk included in the servo signals read by the another head, a step of extracting a sector number shift value of the another head from the sector number shift values set for each one of the plurality of heads, and a step of generating a sector number from the signal indicating the position and the extracted sector number shift value.

According to the present invention, sector numbers on the disk are converted, so the positions in the circumference direction depending on the individual device can be matched, differences among individual devices are solved, and performance can be improved.

In the present invention, it is preferable that the generation step further comprises a step of generating a sector number by adding the signal indicating the position and the extracted sector number shift value. By this, the sector number can be easily converted.

Also in the present invention, it is preferable that the generation step further comprises a step of generating the sector numbers of one track of the disk based on one or a plurality of index signals of the servo signals, with setting the sector number shift value as an initial value. By this, the sector number can be converted with a simple counter.

Also it is preferable that the present invention further comprises a step of judging synchronization with signals of the disk by comparing the generated sector number and the sector number shift value according to the index signal. By this, synchronization of the internally generated sector number and the position of the disk can be confirmed.

Also it is preferable that the present invention further comprises a step of setting the sector number shift value of the head corresponding to the disk face, where the sector number shift value for each one of the heads is recorded, to zero. By this, the shift value recorded on the disk can be easily read.

Also it is preferable that the present invention further comprises a step of measuring the sector number shift value for each one of the heads according to the positions of the index signals before and after switching the head. By this, the sector number shift value can be easily measured.

Also a head position control method of the present invention is a head position control method for a disk device which has a plurality of heads for at least reading the different faces of a disk where servo signals for detecting the position of the head are recorded, comprising a step of calculating the time difference value in the circumference direction of the servo signals between the heads from the sector position that switches one head to another head when the one head of the plurality of heads is switched to another head, and a step of correcting the time of servo gate signals for extracting the servo signals by the time difference value.

According to the present invention, the servo gate time is corrected when the heads are switched according to the displacement of the servo signals in the circumference direction, so the servo signals can be accurately extracted even if the heads are switched and the position of the head can be detected.

Also in the present invention, it is preferable that the calculation step further comprises a step of calculating the time difference value from the time difference information indicated by a sine wave with a same frequency as the rotation frequency of the disk. By this, the servo gate time can be corrected to an accurate servo gate time according to the eccentricity of the disk.

Also in the present invention, it is preferable that the calculation step further comprises a step of calculating the time difference value from the average value of the time difference, and the time difference information indicated by a sine wave and cosine wave with a same frequency as the rotation frequency of the disk. By this, the servo gate time can be corrected to an accurate servo gate time according to the eccentricity of the disk, with removing the influence of phase.

Also it is preferable that the present invention further comprises a step of adjusting the servo gate generation time by a measurement value obtained by measuring the time variation of the servo signals of each one of the heads. By this, the variation of the sampling period during track following can be corrected and servo signals can be accurately extracted.

Also a head position control method of the present invention is a head position control method for a disk device which has a plurality of disks where servo signals for detecting the position of the head are recorded, comprising a step of extracting the displacement amount of a head in the radius direction from a table which stores the displacement amount in the radius direction of another head based on one head where the displacement in the radius direction of the disk between the one head and another head increases in the positive direction according to the track number increasing direction when one head is switched to another head, a step of converting the track number given by the extracted displacement amount, and a step of controlling an actuator for driving the head by the converted track number.

According to the present invention, even if the track positions of the plurality of disks are displaced, the track numbers are converted according to the displacement, so the difference of an individual device is solved, and the seek velocity can be made uniform.

Also it is preferable that the present invention further comprises a step of measuring the displacement amount in the radius direction of the disk of the other head with respect to the first head in the track number increasing direction based on the first head, and a step of determining the head where the displacement in the radius direction of the disk increases in the positive direction of the track number increasing direction to the reference head based on the measured displacement amount. Since the reference head is determined, the track number conversion operation becomes simple.

BRIEF DESCRIPTION OF THE DRAWINGS

FIG. 9 is a diagram depicting the sampling period difference correction table in FIG. 6;

FIG. 10 is a diagram depicting the sector difference correction of the first embodiment of the present invention;

FIG. 11 is a diagram depicting an example of the sector difference correction operation of the first embodiment of the present invention;

FIG. 12 is a diagram depicting the time difference correction operation in the circumference direction of the first embodiment of the present invention;

FIG. 14 is a diagram depicting the sampling period variation correction operation of the second embodiment of the present invention;

FIG. 17 is a diagram depicting a measurement example of the time difference in the circumference direction in FIG. 16;

FIG. 26 is a diagram depicting the track number conversion table in FIG. 6;

FIG. 34 is a diagram depicting the displacement of the track numbers in FIG. 33;

FIG. 35 is a diagram depicting another displacement of the track numbers in FIG. 33;

DESCRIPTION OF THE PREFERRED EMBODIMENTS

Embodiments of the present invention will now be described in the sequence of disk storage device, position demodulation configuration, displacement in the circumference direction correction method, displacement in the radius direction correction method, and other embodiments, but the present invention is not limited to the embodiments herein below.

[Disk Storage Device]

Figure 1:
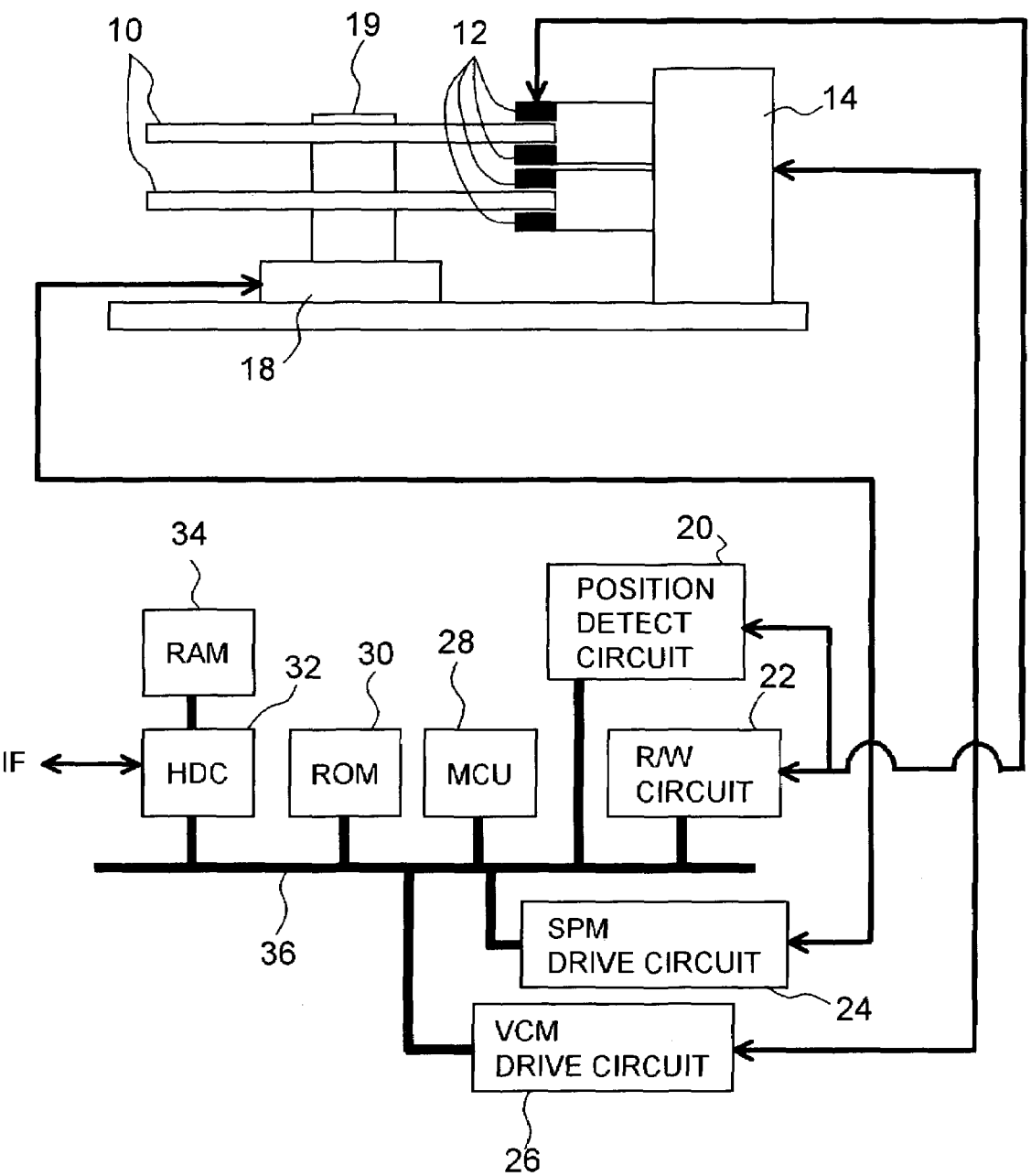
FIG. 1 is a diagram depicting a configuration of a disk storage device according to an embodiment of the present invention.
Figure 2:
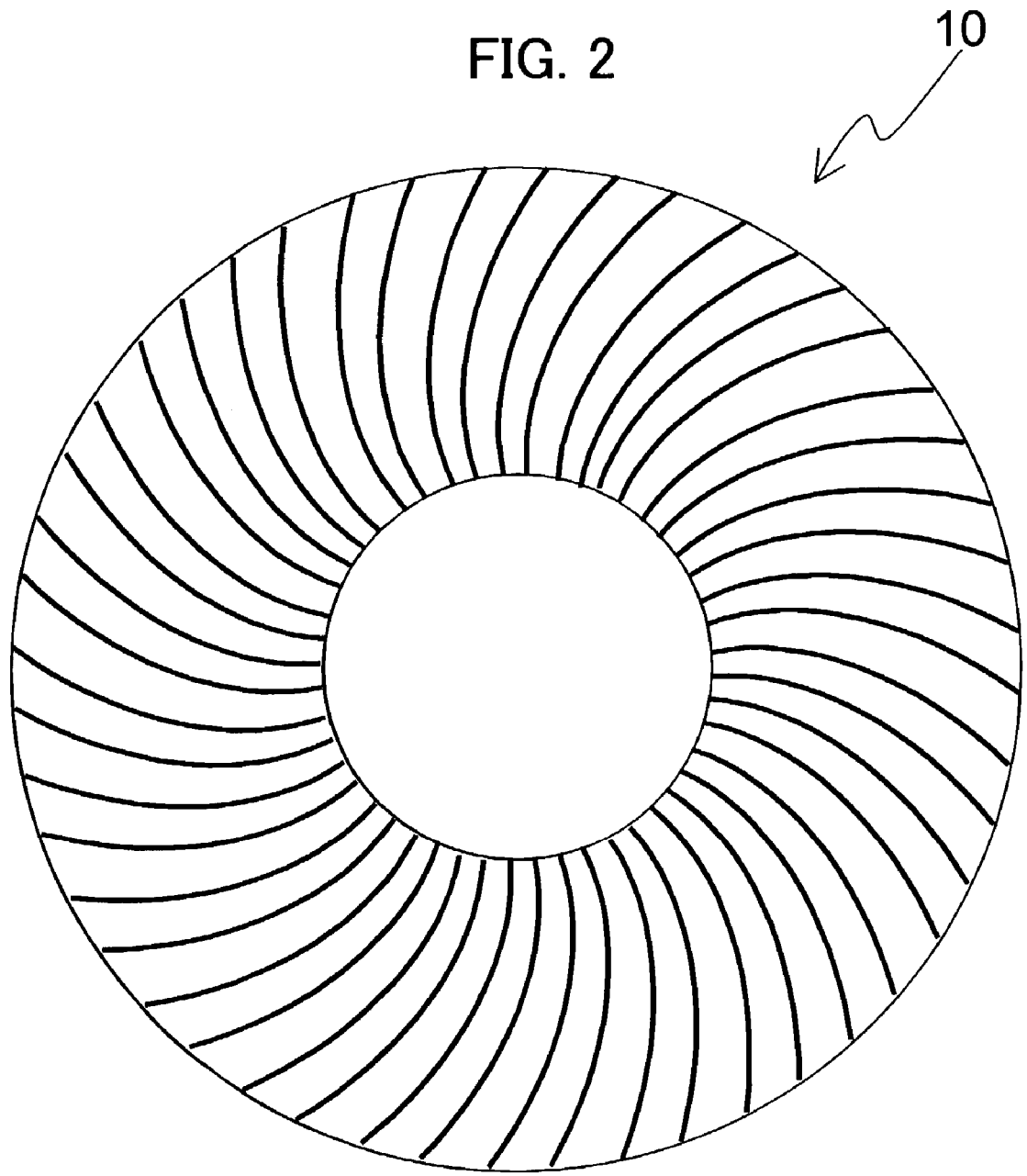
FIG. 2 is a diagram depicting the position signals of the disk in FIG. 1.
Figure 3:
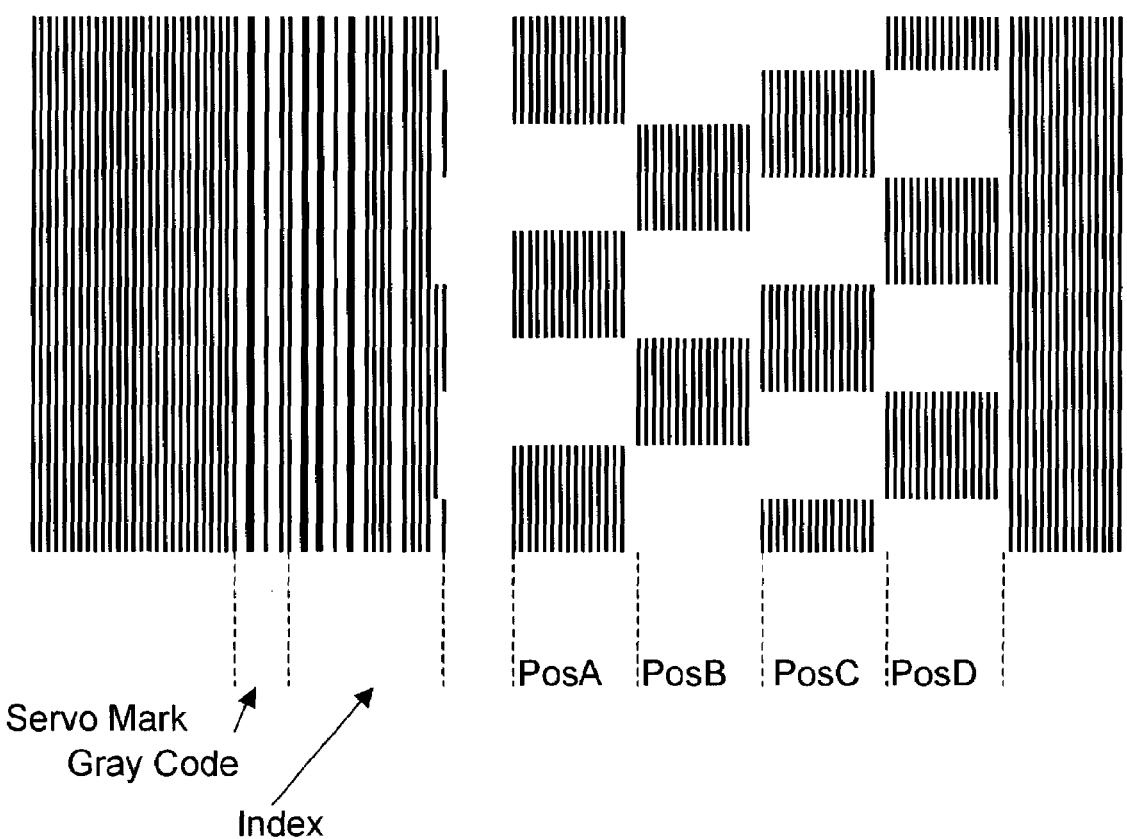
FIG. 3 is a diagram depicting the position signals in FIG. 2 in detail.
Figure 4:
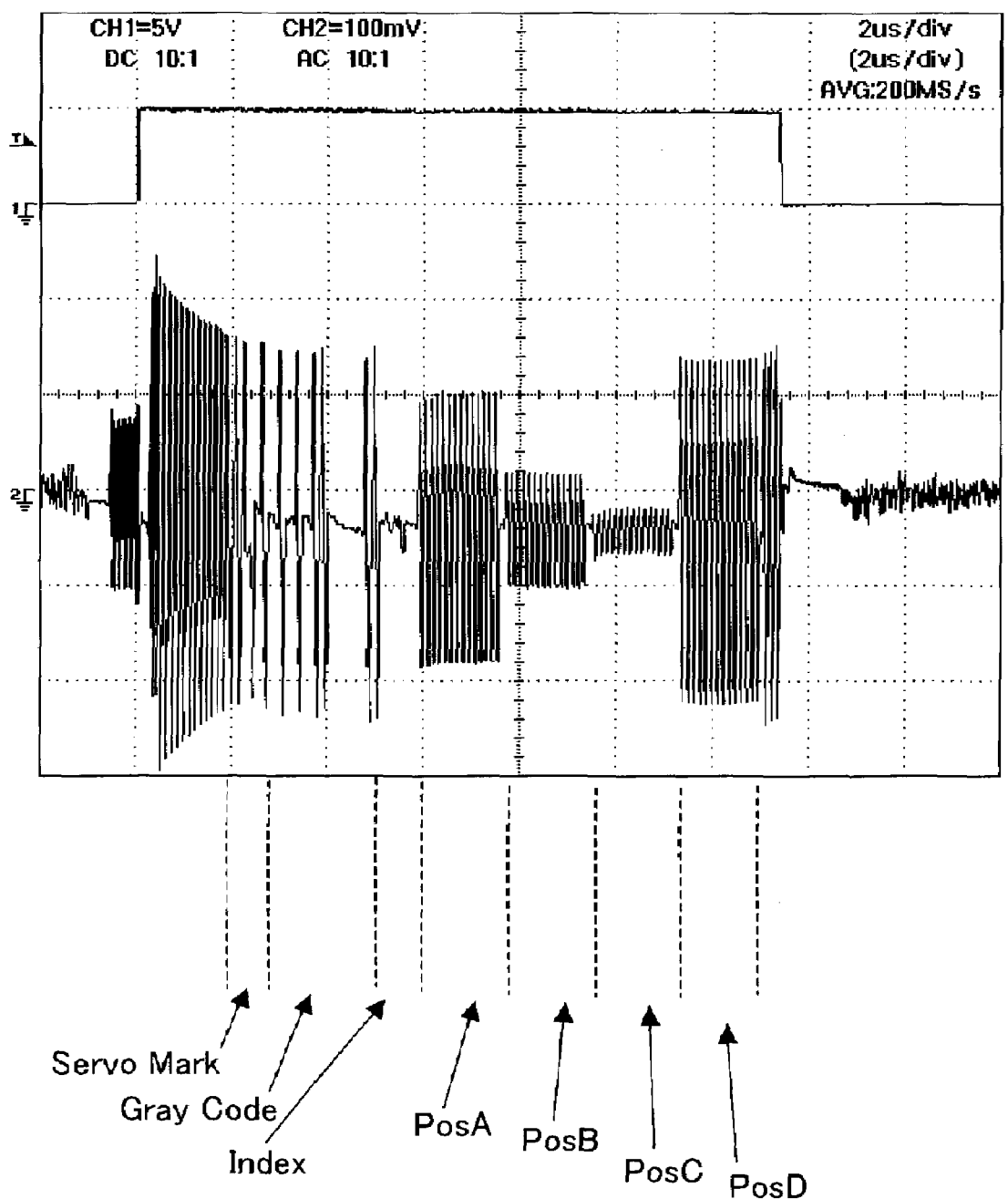
FIG. 4 is a detected waveform diagram of the position signals in FIG. 3.
Figure 5:
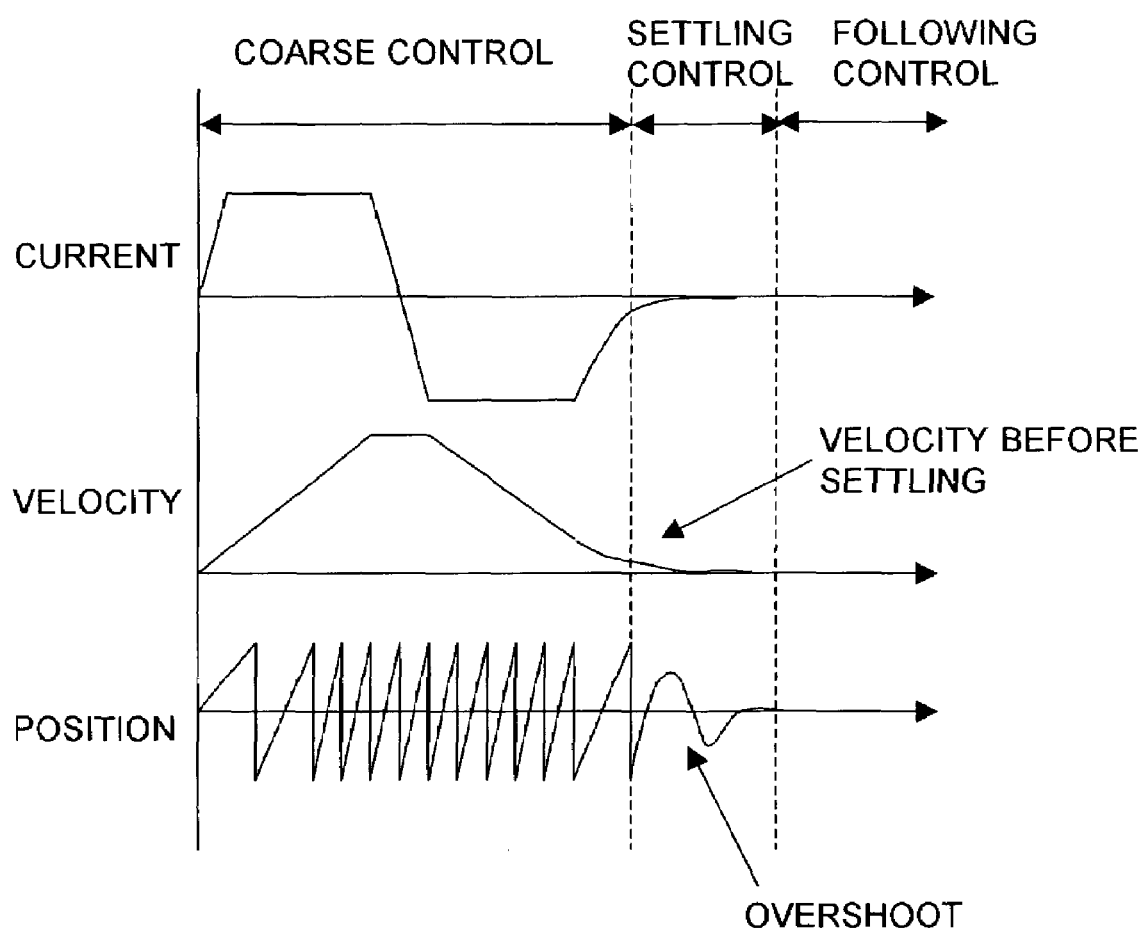
FIG. 5 is a diagram depicting the seek operation of the head in FIG. 1.

FIG. 1 is a diagram depicting a configuration of the disk storage device of an embodiment of the present invention, FIG. 2 is a diagram depicting the arrangement of the position signals of the magnetic disk in FIG. 1, FIG. 3 is a diagram depicting the configuration of the position signals of the magnetic disk in FIG. 1 and FIG. 2, FIG. 4 is a diagram depicting the detected waveform of the position signals in FIG. 3, and FIG. 5 is a diagram depicting head position control.

FIG. 1 shows a magnetic disk device as the disk storage device. As FIG. 1 shows, magnetic disks 10, which are magnetic storage media, are installed on the rotation axis 19 of the spindle motor 18. The spindle motor 18 rotates the magnetic disks 10. The actuator (VCM) 14 has magnetic heads 12 at the tip, and moves the magnetic head 12 to the radius direction of the magnetic disks 10.

The actuator 14 is comprised of a voice coil motor (VCM) which rotates around the rotation axis 19 as the center. In FIG. 1, two magnetic disks 10 are mounted on the magnetic disk device, and four magnetic heads 12 are simultaneously driven by a same actuator 14.

The magnetic head 12 is comprised of read elements and write elements. The magnetic head 12 is configured by layering the read elements, including a magnetic resistance element, on the slider, and layering the write elements, including a write coil, thereon.

The position detection circuit 20 converts the position signals (analog signals) read by the magnetic head 12 into digital signals. The read/write (R/W) circuit 22 controls the read and write of the magnetic head 12. The spindle motor (SPM) drive circuit 24 drives the spindle motor 18. The voice coil motor (VCM) drive circuit 26 supplies drive current to the voice coil motor (VCM) 14, and drives the VCM 14.

The micro controller (MCU) 28 detects the current position by the digital position signal from the position detection circuit 20, and calculates the VCM drive command value according to the error between the detected current position and the target position. In other words, the micro controller 28 performs position demodulation and servo control. The read only memory (ROM) 30 stores the control program of the MCU 28. The hard disk controller (HDC) 32 judges a position in a track based on the sector number of the servo signal, and records/regenerates data. The random access memory (RAM) 34 temporarily stores the read data and write data. The HDC 32 communicates with the host via such an interface IF as ATA and SCSI. The bus 36 connects these components.

As FIG. 2 shows, servo signals (position signals) are arranged at an equal interval in the circumference direction on each track, from the outer track to the inner track. Each track is comprised of a plurality of sectors, and the solid line in FIG. 2 shows the recording positions of the servo signals. As FIG. 3 shows, the position signal is comprised of a servo mark Servo Mark, track number Gray Code, index Index, and offset information PosA, PosB, PosC and PosD.

The position of the magnetic head in the radius direction can be detected using the track number Gray Code and offset information PosA, PosB, PosC and PosD. Also based on the index signal Index, the position of the magnetic head in the circumference direction can be known. For example, the sector number when the index signal is detected is set to No. 0, and the sector number is incremented each time the servo signal is detected, so as to obtain the sector number of each sector of the track.

The sector number of this servo signal becomes a reference for recording/regenerating data. There is one index signal in each track. Instead of an index signal, a sector number may be provided.

FIG. 4 is a waveform diagram of the position signals in FIG. 3 detected by the head. The present embodiment relates to a position demodulation device for determining a position in the radius and circumference directions using such detected servo signals (position signals), and a method thereof.

FIG. 5 is an example of the seek control of the actuator performed by the MCU 28 in FIG. 1. Through the position detection circuit 20 in FIG. 1, the MCU 28 confirms the position of the actuator, performs servo calculation, and supplies an appropriate current to the VCM 14. FIG. 5 shows the transition of control from the start of seeking, which moves the head 12 from a certain track position to the target track position, current of the actuator 14, velocity of the actuator (head), and position of the actuator (head).

For the seek control, the head can be moved to the target position by transiting coarse control, settling control, and following control. The coarse control is basically a velocity control, and the setting control and following control are basically position control, and both must detect the current position of the head.

To confirm such a position, the servo signals are recorded on the magnetic disk in advance, as shown in FIG. 2. In other words, as FIG. 3 shows, a servo mark to indicate the start position of the servo signal, Gray Code to indicate the track number, index signal, and such signals as PosA–D to indicate offset, are recorded. When the signals are read by the magnetic head, a time waveform, as shown in FIG. 4, can be obtained. The position detection circuit 20 converts the servo signals in FIG. 4 into digital values, and MCU 28 demodulates the position as described later in FIG. 6 and thereafter.

[Position Demodulation Configuration]

Figure 6:
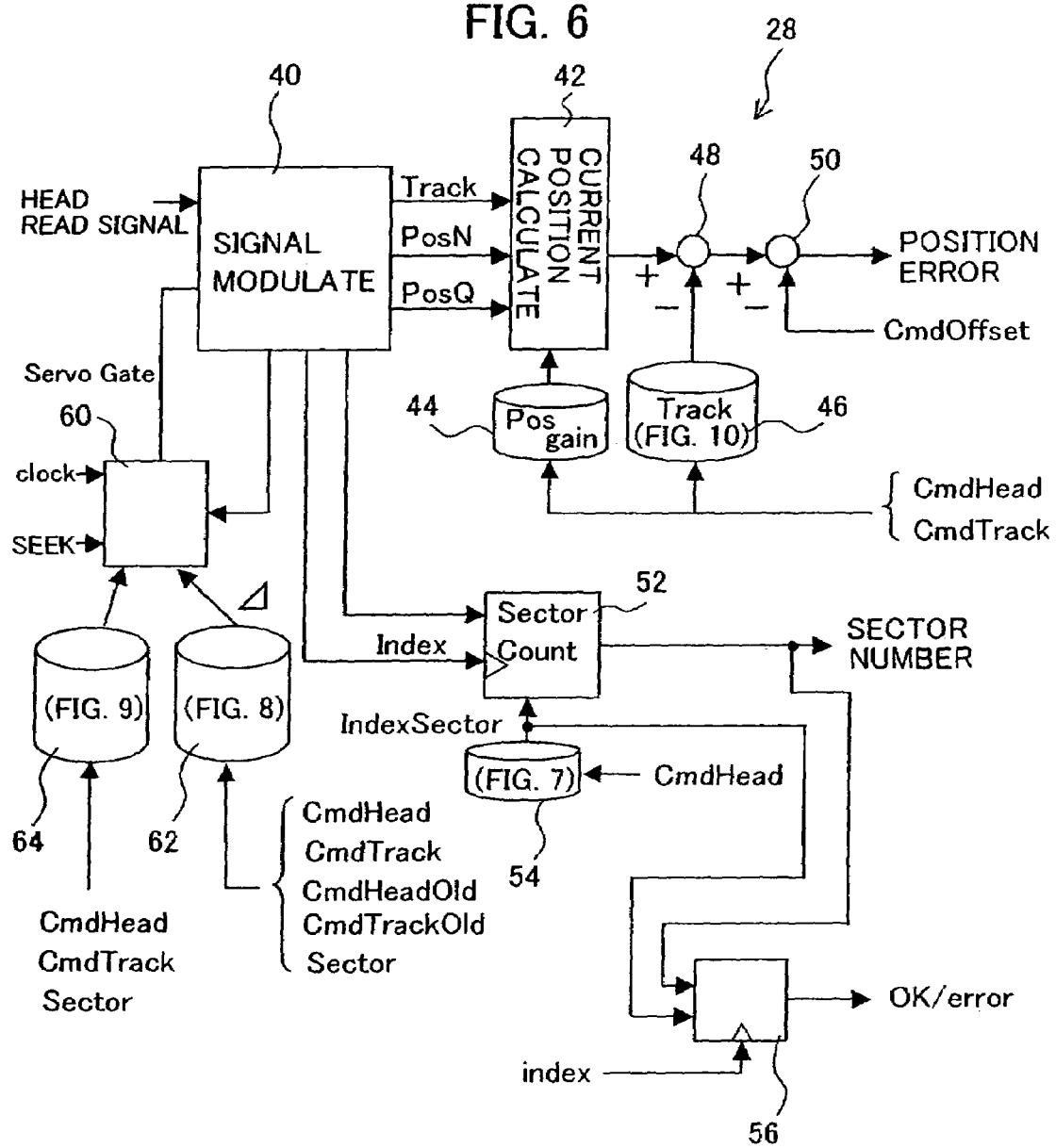
FIG. 6 is a functional block diagram of the position demodulation section in FIG. 1.

FIG. 6 is a block diagram depicting the position demodulation function executed by the MCU 28 in FIG. 1.

In FIG. 6, the signal demodulation section 40 extracts the read signals in the period indicated by the servo gate from the read signals of the head 12, and demodulates the servo mark, track number (Gray Code), index signal and offset signals PosA–PosD described in FIG. 3. Also the signal demodulation section 40 demodulates the offset information PosN and PosQ, shown by the following formula, from the offset signals PosA–PosD.

PosN=PbsA−PosB

PosQ=PosC−PosD

The current position calculation section 42 receives the track number Track and the offset information PosN and PosQ, and calculates the current position. The position sensitivity gain table 44 has been created to correct the velocity offset of PosN and PosQ at this time. The position sensitivity gain table 44 stores the position sensitivity gain of each zone of each head.

With the current command head number CmdHead and the command track number CmdTrack, the corresponding sensitivity gain of PosN and PosQ are read from the position sensitivity gain table 44. The current position calculation section 42 corrects the PosN and PosQ which were input using these sensitivity gains, and calculates the current position by adding the result to the track number. This velocity offset correction method is disclosed in detail in Japanese Patent Laid-Open No. 2001-256741, for example.

Then the positional error is calculated. Referring to the track conversion table 46 for correcting the above mentioned difference in the radius direction by the current command head number CmdHead and the command track number CmdTrack, the command position where difference is corrected is obtained. This track conversion table 46 stores the track number differences which are different for each head and for each zone, and details will be described later with reference to FIG. 16 and thereafter.

The addition section 48 subtracts the command position of the track conversion table 46 from the current position from the current position calculation section 42, and obtains the positional error. The addition section 50 provides offset for read and write when the read elements and write elements are separated, and subtracts the offset from the positional error. The positional error obtained in this way is input to a known servo computing section, which is not illustrated, executed by the MCU 28, where the control amount of the VCM 14 is calculated.

The servo gate generation section 60 basically generates the servo gate signals at a predetermined interval of sampling period Ts. In the present invention, the servo gate generation section 60 is controlled by the two tables 62 and 64 for correcting the displacement in the circumference direction, as described later. In other words, two new tables 62 and 64 are added to the block for generating a servo gate. One of the tables, 62, is for determining the displacement between heads when heads are switched. The other table, 64, stores values for calculating the time variation of the adjacent servo signals on the same track.

In the sector counter 52, a value is set when the index signal Index is detected, the value increments by "1", and outputs the sector number at each sampling (servo gate) period. The index sector table 54 is connected to the sector counter 52. The index sector table 54 stores the difference amount of the index according to each head. In other words, one table 54 is added to the block where the sector numbers are generated, and the sector number which is stored when the index signal is detected is stored for each head.

The comparator 56 compares the difference amount of the sector number of the sector counter 52 and the index sector table 54, and judges whether the current sector number synchronizes with the signal on the disk.

[Displacement in Circumference Direction Correction Method]

Figure 7:
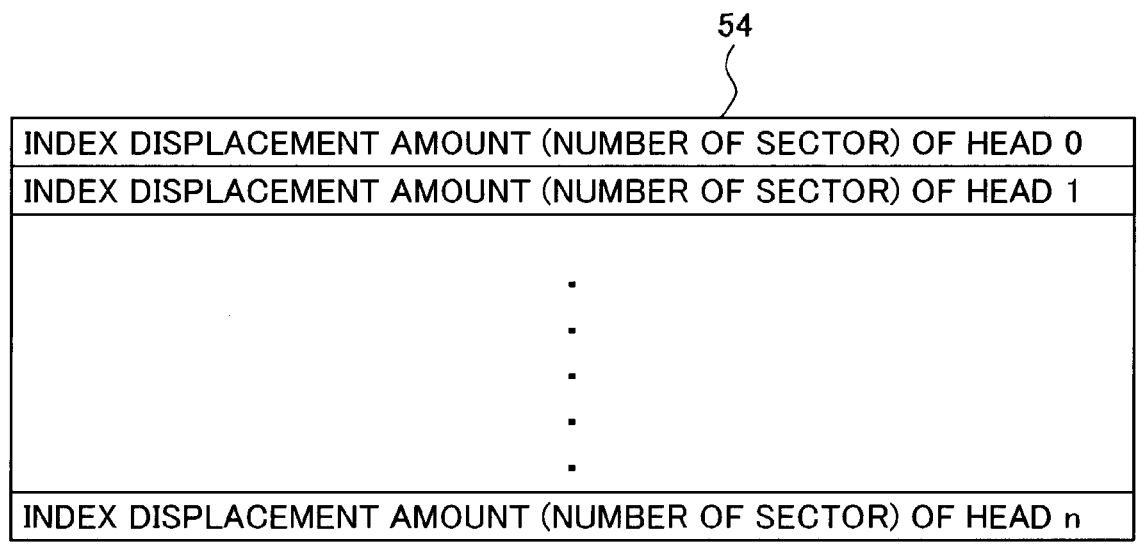
FIG. 7 is a diagram depicting the index correction table in FIG. 6.
Figure 8:
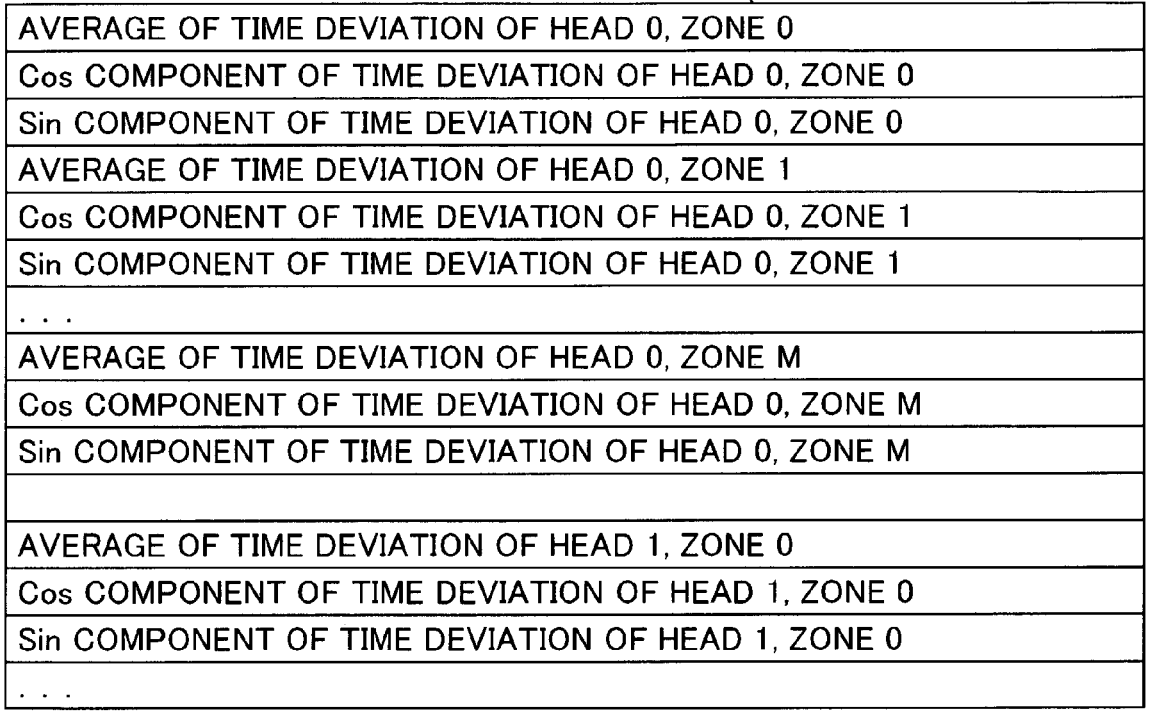
FIG. 8 is a diagram depicting the time difference correction table in FIG. 6.
Figure 13:
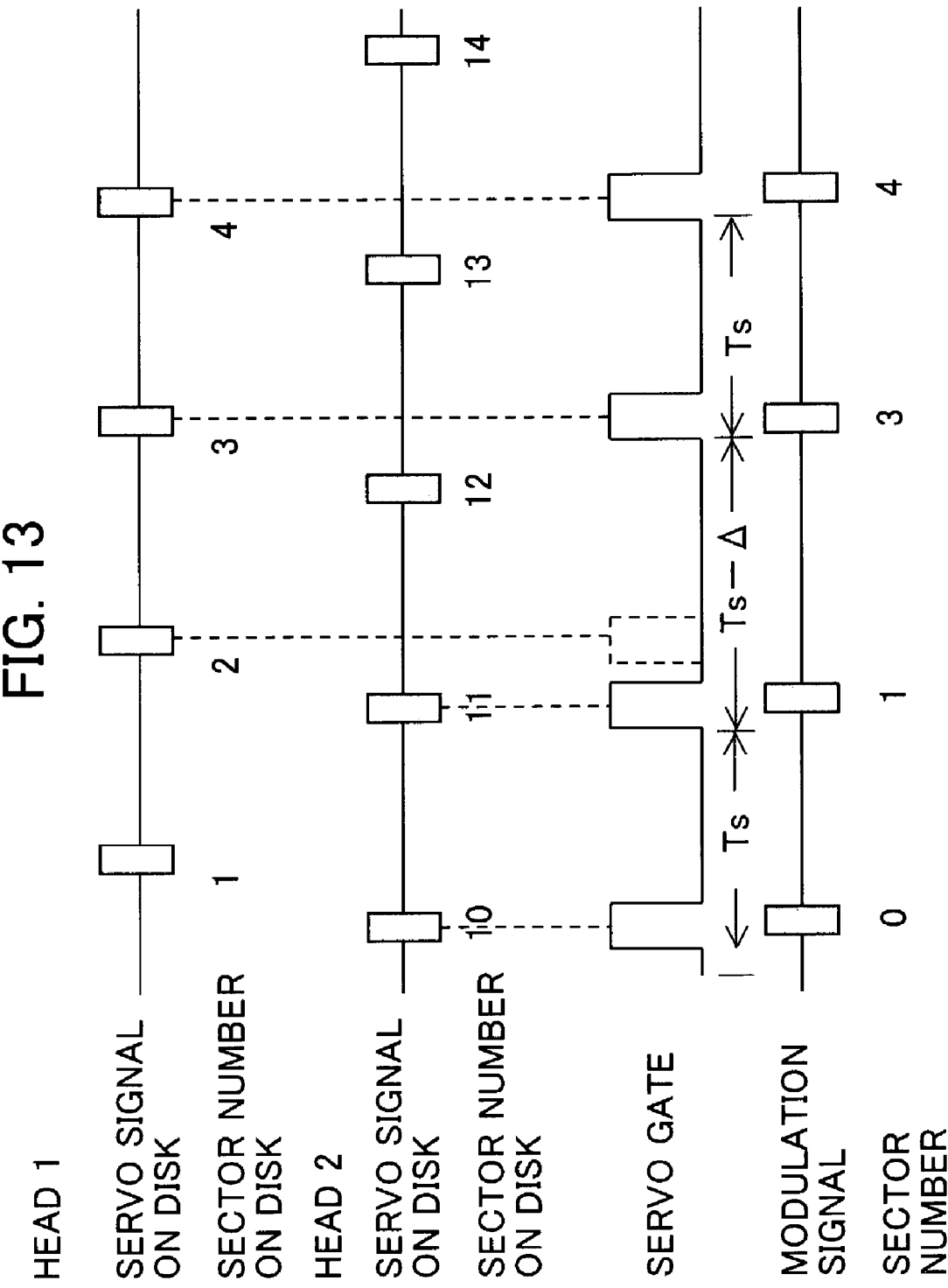
FIG. 13 is a diagram depicting another time difference correction operation of the circumference direction of the first embodiment of the present invention.
Figure 15:
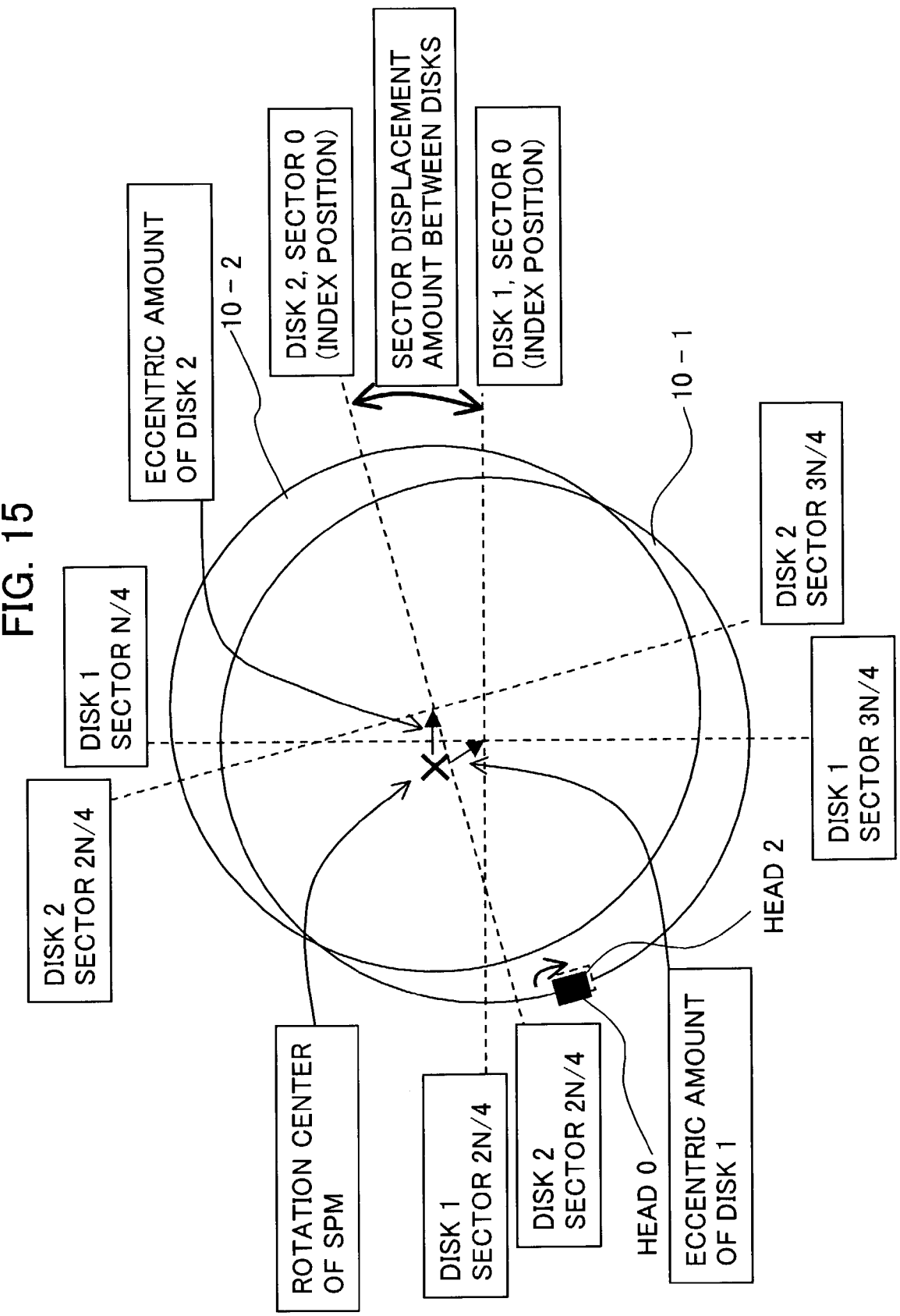
FIG. 15 is a diagram depicting the head switching operation of the present invention.

The correction of displacement in the circumference direction will now be described. FIG. 7 is a diagram depicting the configuration of the sector table in FIG. 6, FIG. 8 is a diagram depicting the configuration of the displacement correction between heads table in FIG. 6, FIG. 9 is a diagram depicting the configuration of the sampling period correction table, FIG. 10 is a diagram depicting the index displacement correction operation, FIG. 11 is a time chart depicting the index correction operation, FIG. 12 and FIG. 13 are diagrams depicting the correction operation in the circumference direction when heads are switched, FIG. 14 is a diagram depicting the time variation of a servo gate due to eccentricity, and FIG. 15 is a diagram depicting the time difference in the circumference direction correction operation.

As shown in FIG. 6, The tables 54, 62 and 64 have been created to correct the displacement in the circumference direction. As FIG. 7 shows, the index sector table 54 stores the displacement amount of the index of each head 0–n as the number of sectors. This index sector table 54 is referred to by the command head number CmdHead, and the corresponding displacement amount of the index is output to the sector counter 52. The displacement amount of the index is loaded to the sector counter 52 as an initial value with the index signal Index as a trigger.

The physical meaning of the sector displacement amount will be described with reference to FIG. 10 and FIG. 11. As FIG. 10 shows, it is assumed that the head 0 and the head 1 and the head 2 and head 3 are in charge of the front and back of a same disk 10. Then the displacement amount between the front and back of the disk 10 is small. On the other hand, the sector displacement amount between the different disks, 10-1 and 10-2, is large. In the case of the example in FIG. 10, the index signal position of the head 0 is determined to be the sector No. 0. For the other heads, the sector displacement amount according to the displacement is stored.

As FIG. 11 shows, when an index signal is detected, the sector displacement amount of the command head is loaded from the table 54 to the sector counter 52. Therefore the sector counter 52 adds the amount of the displacement and creates a new sector number.

For example, the example in FIG. 11 shows processing when the head 0 is switched to the head 2. Between the head 0 and head 2, the sector numbers are shifted for 10 sectors in this example. Now it is assumed that the head 0 is switched to the head 2 at the location of the sector 10 of the head 0 when demodulated by the head 0. At this time, servo signals are dislocated between the heads, so the value of the sector number 0, which was read by the head 2, must be converted to 10 so that the sector numbers becomes continuous.

For this, the sector number offset value of the head 2, which is the sector displacement amount between the head 0 and the head 2, is set to "10" in advance. When the head 0 is switched to the head 2, the index of the head 2 is detected, and the offset value "10" is loaded to the counter 52. By this, the sector numbers, "0", "1", "2", . . . viewed from the index of the head 2 are converted to the sector numbers "10", "11", "12", . . . corresponding to the sector numbers of the head 0. In other words, the displacement of the index is corrected, and the sector positions in the circumference direction are corrected to be the same for each disk.

Now the displacement of the servo signals in the circumference direction between heads is corrected. As FIG. 8 shows, the time difference value for each zone of each head is stored in the time difference table 62 between heads. This time difference value is comprised of three values, an average value, Cos component, and Sin component. The values of the Cos component and the Sin component are included because the time difference amount between heads fluctuates non-uniformly in the circumference direction, but the time difference value fluctuates in a sine wave which has the same frequency as the rotation frequency.

In the configuration in FIG. 6, when heads are switched, the time difference amount Δ of the servo signals between the heads is calculated referring to the time difference table 62 by the head number, track number, and sector number before switching and the head number after switching, and the servo gate generation time of the servo gate generation section 60 is corrected.

This processing will be described with reference to FIG. 12 and FIG. 13. FIG. 12 shows processing when the head 0 is switched to the head 2. In this sample, the sector numbers are shifted for 10 sectors between the head 0 and the head 2. It is now assumed that the head 0 is switched to the head 2 at the location of the sector 1 of the head 0 when demodulated by the head 0. Since the servo signals are dislocated between the heads, the servo gate generation time must be adjusted immediately after the heads are switched. Also as described above, the value, sector number 12, which was read by the head 2, must be converted to "2" so that the sector numbers become continuous.

Therefore the servo gate generation interval Ts is changed to (Ts−Δ) immediately after the heads are switched, then the servo gate generation interval is reset back to Ts thereafter. By this, the displacement of servo signals in the circumference direction is corrected, and servo information can be extracted by the servo gate even after the heads are switched.

FIG. 13 also shows an example similar to above. Here an example when the head 2 is switched to the head 1 at a location which is different from above is shown. In this example, the heads are switched at the sector 11 of the head 2. In this case, the time difference of the servo signals is short, and the processing of the MCU 28 does not complete within this short time. So the servo gate generation time is extended for one sample more (Ts+A), and then heads are switched. In this way, the sector number 3 is demodulated after the sector number 1.

Now the correction of the sampling period will be described. As FIG. 14 shows, the servo information has a same interval on a same track, and servo gates are generated at a same interval if eccentricity does not occur. If eccentricity occurs, the angular velocity of the servo information on a same track changes, so the time interval of the servo signals changes. Therefore the servo gate generation interval must be changed accordingly.

FIG. 9 is a diagram depicting the configuration of the sampling period difference correction table 64 shown in FIG. 6. In this table as well, values are stored sequentially from the head 0. The average value, Cos component and Sin component are stored for each zone. The variation of the sampling period (variation of the time interval between adjacent servo signals) also exhibit a sine wave variation, which has the same frequency as the rotation frequency of the disk. Therefore the Cos component and the Sin component are required.

In the configuration shown in FIG. 6, the table 64 is referred to by head number, track number and sector number at track following, the corresponding average value, Cos component and Sin component are read, the time interval is calculated, the servo gate generation section 60 is controlled, and the time interval of the servo gate is controlled as shown in FIG. 14.

FIG. 15 shows the operation of the heads 0 and 2 when two STW-completed disks 10-1 and 10-2 are installed on the spindle motor 18. The difference between the rotation center 19 of the spindle motor 18 and the rotation center of the disks 10-1 and 10-2 at STW is the eccentricity amount. Servo signals are disposed between the disks 10-1 and 10-2 in the radius direction and circumference direction.

When the head 0 of the disk 10-1 is switched to the head 2 of the disk 10-2 (at seek start), the above mentioned correction of the index and correction of the time difference between the heads are performed. And during the following of each head 0 and 2, the above mentioned sampling period is corrected. In this way, dislocation in the circumference direction is corrected.

Figure 16:
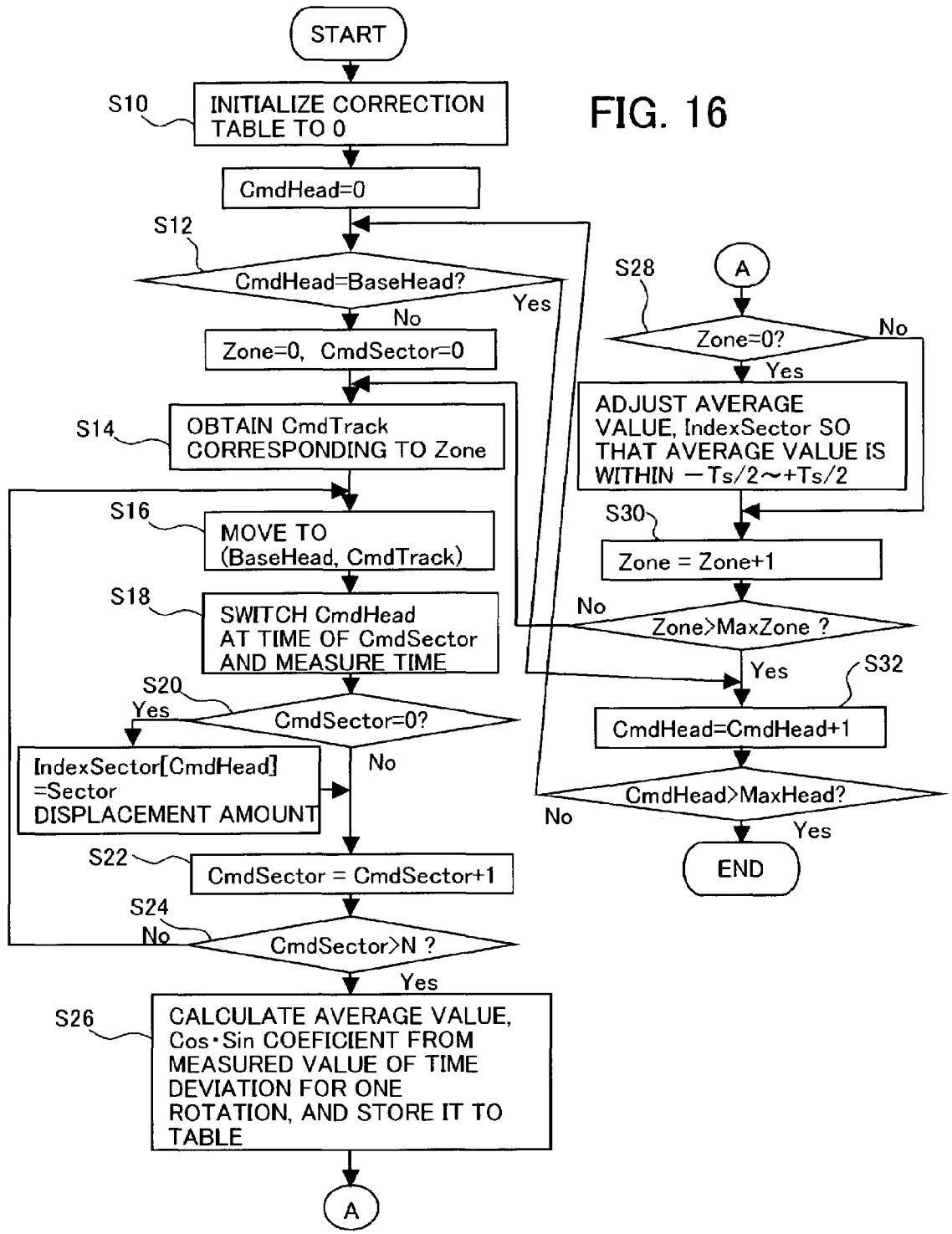
FIG. 16 is a flow chart depicting the measurement processing of the time difference between the heads of the first embodiment of the present invention.

Now the time difference amount measurement processing in the circumference direction will be described. FIG. 16 is a flow chart depicting the measurement processing of the time difference between heads. FIG. 16 shows the measurement method for the difference of the sector numbers and the time difference between heads, out of the differences in the circumference direction. The meanings of the symbols in FIG. 16 are as follows.

| | |
|---|---|
| CmdHead | Target head |
| CmdTrack | Target track |
| BaseHead | Reference head |
| Zone | Measurement target zone |
| IndexSector[ ] | Table for storing sector difference amount for each head |
| CmdSector | Target sector when heads are switched |
| MaxZone | Maximum value of Zone number |
| MaxHead | Maximum value of head number |

To measure the sector number difference amount, only one reference head BaseHead is determined out of the plurality of heads. For this reference head, the sector number difference amount is set to "0" in advance. Normally the number of the reference head is set to a number the same as the reference head measurement when displacement in the radius direction is measured, which will be described later. And while tracking with the reference head, the head is switched to a head with a different number. Then the value of the sector number immediately after the switching is detected. By detecting the sector number difference amount at this time, the sector number offset of the measurement head can be set.

Such a difference of sector numbers is a rough value. For example, in the case of a device which has 120 sector numbers on a track, the difference in the circumference direction can be detected only in $\frac{1}{120}$ units. To detect servo signals, however, a more accurate time difference must be detected. If this difference amount cannot be accurately known in advance, servo signals cannot be detected when heads are switched. For this the following setting is executed. First one head is positioned. This head is determined to be the reference of measurement.

Then the heads are switched at the sector number 0, and the sector number and the time difference amount of the head which is switched to are detected. If the sector number and the time difference amount cannot be detected after the heads are switched, the time difference amount and the sector difference amount may be determined by subtracting the standard value of the time interval of the servo signals from the time detected in a mode for searching servo marks. When servo signals are detected, the time difference thereof is determined. This operation is determined for one track.

By determining the average value of the difference amounts, the average difference time can be determined. Variation of the difference between the heads within a track can be approximated by a sine wave. Therefore Fourier transform is performed, and the sine factor and the cosine factor of the rotation frequency are determined.

The average value of the time difference and the sine and cosine factors are stored in a table in advance. And the difference amount of the sector numbers is also stored in advance.

For the sector difference amount, however, a same value must be used for any location from the inner track to the outer track of the disk. Different values may be used for the time difference amount. This is because the time difference amount is used for detecting servo signals with certainty when the heads are switched. This value is unnecessary once the servo signals are detected.

The case of the sector difference amount is different. The sector difference amount is for generating timing to record/regenerate data using the value of the sector difference amount. Therefore if the difference amount is different, such as when the difference amount is "1" for a track and "10" on another track, then it becomes difficult to adjust timing. Therefore only one value must be used for the difference amount of the sector numbers between heads.

Since there is only one sector difference value, the time difference may exceed one sampling period, depending on the case. Even in such a case, still only the sector difference amount must be used. Therefore the locations to measure the sector difference amount must be determined. For example, the sector difference amount is measured only for a specific area at an outer track.

The processing flow in FIG. 16 will now be described.

(S10) The correction tables 54 and 62 are initialized to "0". Then the target head is initialized to "0".

(S12) It is judged whether the target head is the reference head. If the target is the reference head, processing advances to the target head changing step in step S32. If the target head is not the reference head, the measurement target zone is initialized to "0", and the target sector when the heads are switched is initialized to "0".

(S14) The target (measurement) track corresponding to the zone Zone is set.

(S16) VCM is moved so that the reference head positions at the target track.

(S18) At the time when the reference head detects the target sector, the current head is switched to the target head, and time measurement starts.

(S20) It is judged whether the target head detected the target sector (=0). If the target sector is detected, the sector difference amount (number of sectors) is obtained from the time at measurement, and is stored in the sector difference amount of the head in the correction table 54.

(S22) Then the target sector is incremented by "1".

(S24) It is judged whether the target sector exceeded the maximum value N of the number of sectors of a track. If not, processing returns to step S16.

(S26) If the target sector exceeded the maximum value N, measurement for one track is over, so the average value and the factors of Cos and Sin components are calculated from the time difference measurement values for one track, and are stored in the correction table 62 in FIG. 8.

(S28) Now it is judged whether the measurement target zone is zero. If the measurement target zone is zero (the outermost track in this case), the average value and the sector difference amount are adjusted so that the average value comes to within −Ts/2−+Ts/2, as described later with reference to FIG. 18.

(S30) The measurement target zone is incremented by "1". And it is judged whether the measurement target zone exceeded the maximum zone MaxZone of the disk. If not, processing returns to step S14.

(S32) If the measurement zone exceeds the maximum zone, the next head becomes the target, the target head is incremented by "1". And it is judged whether the target head number exceeded the maximum head number of the device. If not, processing returns to step S12. If exceeded, the sector displacement and the time difference have been measured for all heads, so processing ends.

FIG. 17 is an example of the measurement result when this processing has been executed. Measurement was performed in a device where two disks, where single disk STW has been performed, are mounted on a 2.5 inch hard disk drive. In this example, the head 2 is the reference head, and the time difference amount of the head 0 viewed from the head 2 is measured. In FIG. 17, the average value, Cos component and the Sin component are shown sequentially from the top, where the difference amount changes according to the track number (inner/outer track).

Figure 18:
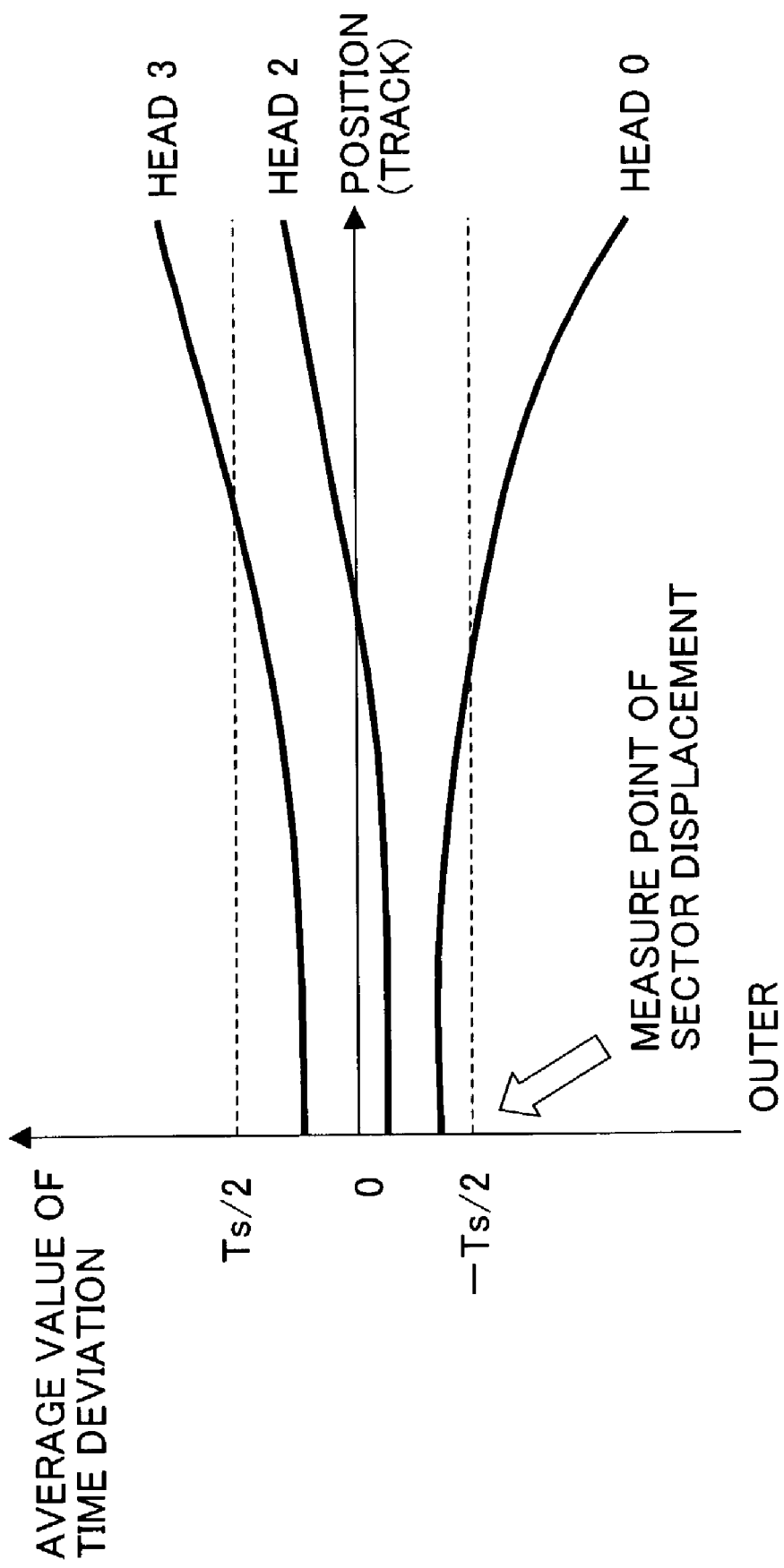
FIG. 18 is a diagram depicting the calculation of the average value of the time difference in FIG. 16.

As FIG. 18 shows, the time difference is measured as well when the sector difference amount is measured at the outer track. And if the absolute value of this average time difference amount is greater than the servo time interval Ts for ½ sectors, the time corresponding to one sector is adjusted in advance so as to be in the −½−+½ range.

In FIG. 18, the head 1 is the reference head, and the other heads 0, 2 and 3 are the measurement targets. At this time, the sector difference amount is measured at one location of the movable range at an inner and outer track, in this case at the left end in FIG. 18. At this position, the sector difference amount is also adjusted so that the average value of the time difference at this location enters the specified range.

Now the storage positions of the table will be described. There are two types of positions where the sector number offset value for each head is stored. One is non-volatile memory (ROM) on the circuit substrate, and the other is on the disk. No innovation is necessary to store on the ROM. The sector number offset value is merely stored as is, and is used simply referring to the value in ROM.

However innovation is necessary to store the sector number offset value on the disk 10. When the signal on the disk was never detected immediately after power is turned ON, the sector number offset value has not been set in the circuit. So even in such a state, the sector number offset amount on the disk must be detected.

Figure 19:
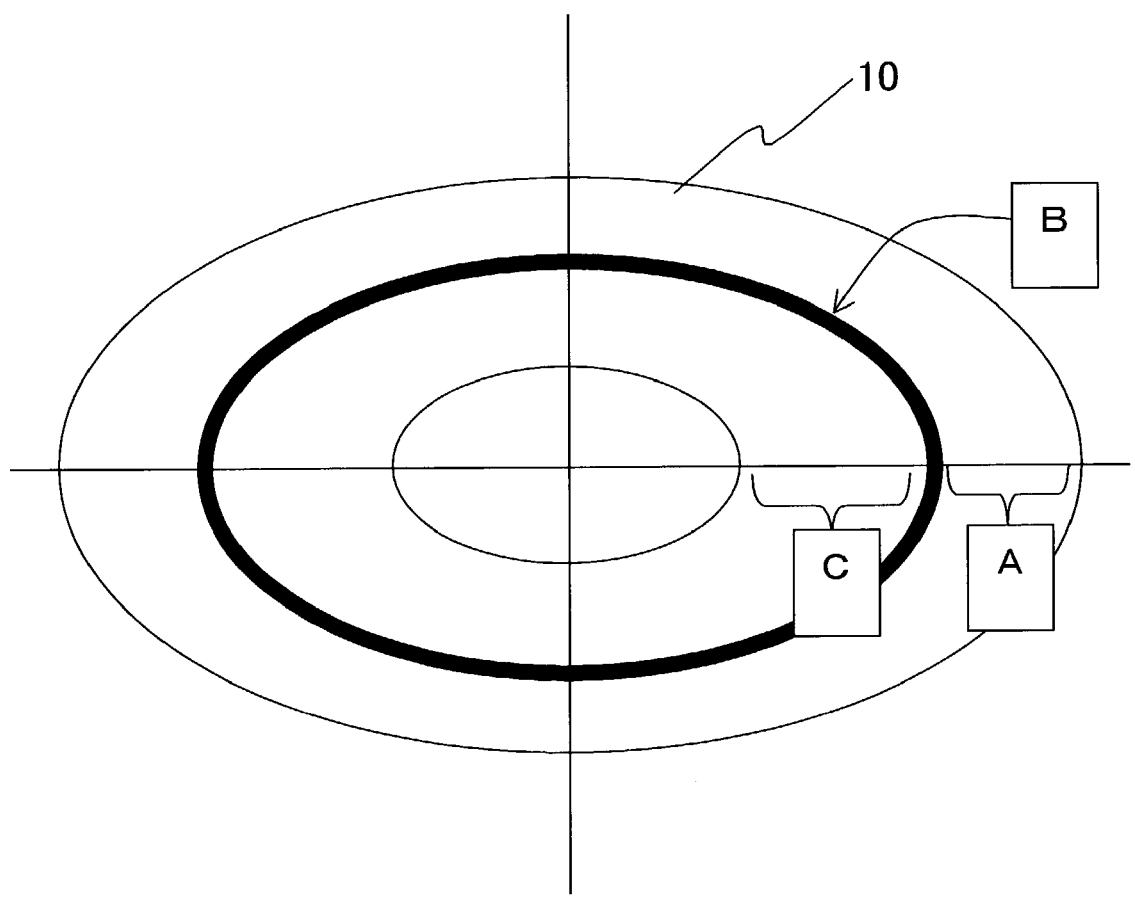
FIG. 19 is a diagram depicting the positions of the measurement result in FIG. 16 stored on the magnetic disk.

For this, the area on the disk 10 is divided into two, A/C and B, as shown in FIG. 19. One area is area B, for which the sector number on the disk is used as is when the data is recorded/regenerated, and the other area is area A/C, for which the sector number offset for each head is added to the detected sector number, and the result is used when the data is recorded/regenerated.

Immediately after power is turned ON, the first area B is accessed, and information different for each individual device is read from the disk. In other words, the area B is the area where information on difference, depending on the individual device, is stored. To record/regenerate the area B, the sector difference between the heads is ignored. In the area B, not only the sector number offset information, but other information may be recorded. So to access this area, the amount of converting the sector number must be changed.

In this way, the time difference between the heads is measured, and the sector difference and the time difference can be corrected. However, even when the heads are not switched, a time difference problem occurs due to eccentricity. As FIG. 14 shows, eccentricity has occurred to a device where servo signals were recorded outside. Along with this eccentricity, the time between servo signals fluctuates. In a conventional signal demodulation circuit, it is assumed that the time between servo signals is a constant. Therefore it is not desirable that this time fluctuates. For example, if eccentricity is too large, the servo mark gate for servo signal detection does not synchronize with the actual servo signals and cannot detect servo marks, and an error is generated.

To solve this problem, the time variation between servo signals (the time variation of a sampling period) is measured, and the servo gate generation time is adjusted according to the actual servo signals.

Figure 20:
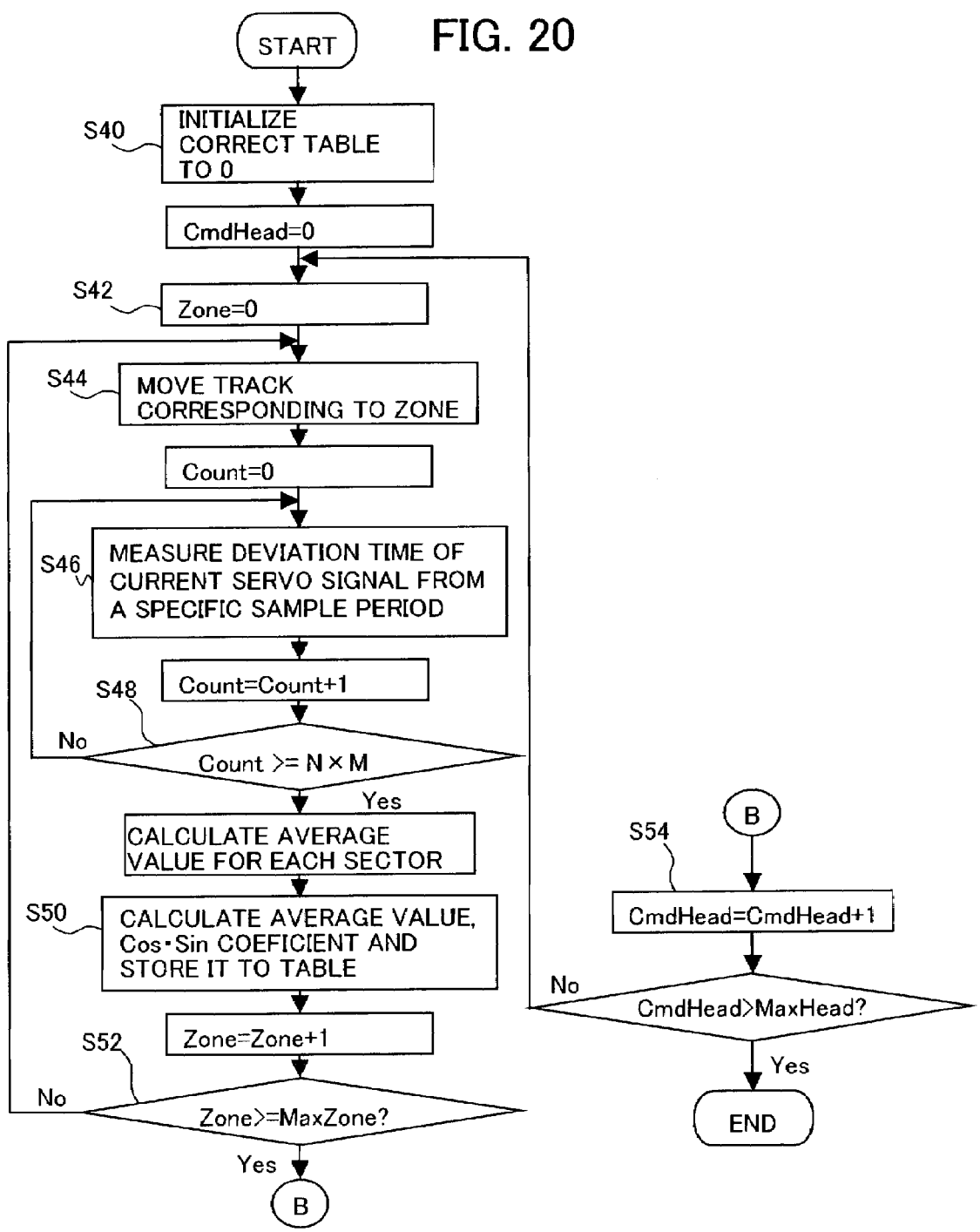
FIG. 20 is a flow chart depicting the measurement processing of the sampling period variation in the circumference direction of the first embodiment of the present invention.

FIG. 20 is a flow chart depicting the sampling period time variation measurement processing. In this measurement, the time variation of one track of the disk is measured, and the average value of these values is determined, and Fourier transform is also performed and the factors of Sine and Cosine are determined.

(S40) The correction table 64 is initialized to "0". Then the target head CmdHead is initialized to "0".

(S42) The measurement target zone is initialized to "0".

(S44) VCM is moved to the target track corresponding to this zone Zone. The measured count value Count is initialized to "0".

(S46) Servo signals are detected from the read signals of the head, and the time difference from the specified sampling period of the current servo signals is measured. And each time a servo signal is detected, the measured count value is incremented by "1".

(S48) It is judged whether the measured count value exceeded the maximum value N×M of the number of sectors of a track. If not, processing returns to step S46.

(S50) If the measured count value exceeded the maximum value N×M, measurement for one track has been completed, so the average value of the values between sectors is calculated. Also the factors of the Cos and Sin components are calculated, and are stored in the correction table 64 in FIG. 6 and FIG. 9. Then the measurement target zone is incremented by "1".

(S52) And it is judged whether the measurement target zone exceeded the maximum zone MaxZone of the disk. If not, processing returns to step S44.

(S54) If the measurement zone exceeds the maximum zone, the next head is the target, so the target head is incremented by "1". And it is judged whether the target head number exceeded the maximum head number of the device. If not, processing returns to step S42. If exceeded, on the other hand, the time differences of the sampling periods of all the heads have been measured, so processing ends.

When the servo signals are demodulated, that is when positioning control is being executed, the measurement values of the table 64 is always referred to, the time variation of the servo gates of the next sample or the servo mark gates is calculated, and the signal generation time is shifted according to the amount of the difference.

Figure 21:
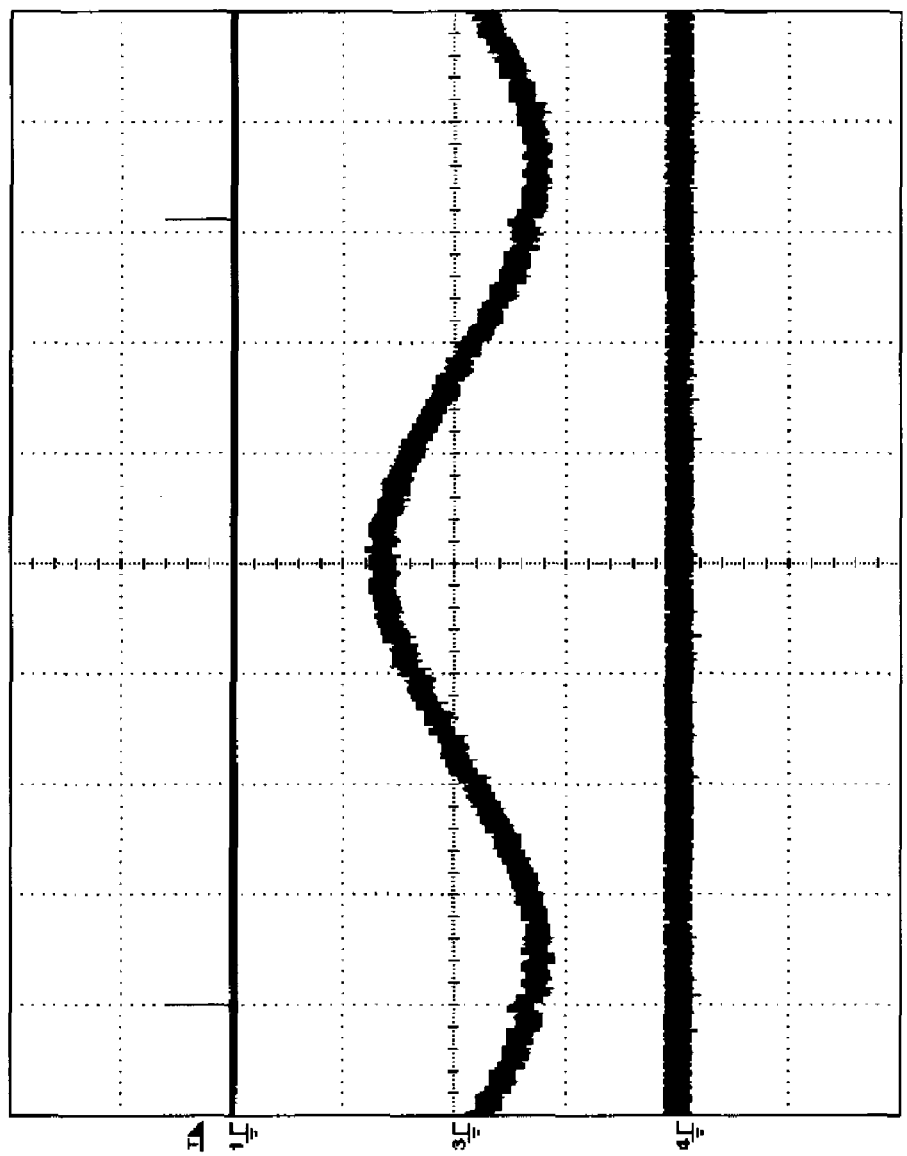
FIG. 21 is a diagram depicting the sampling period variation in FIG. 20.
Figure 22:
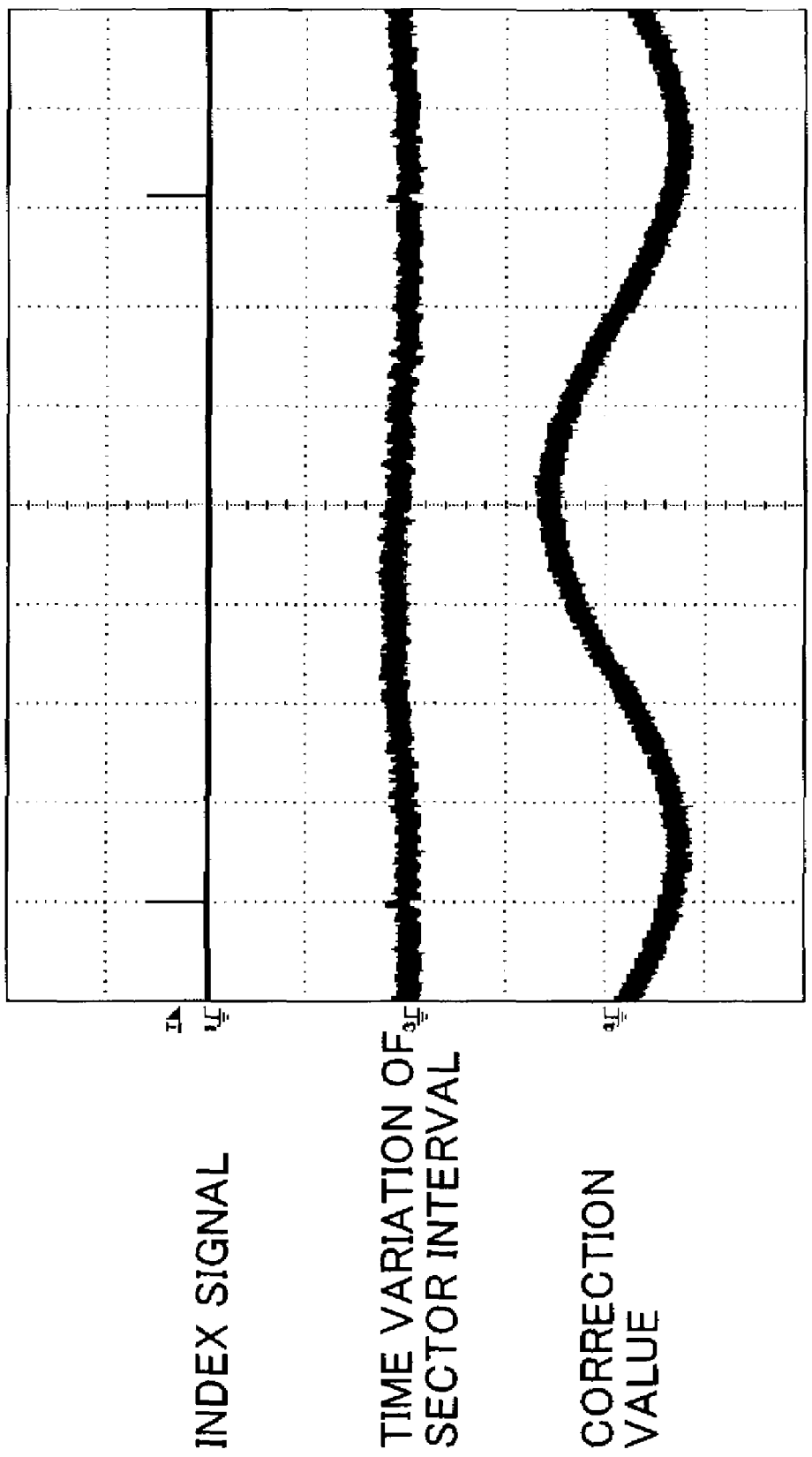
FIG. 22 is a diagram depicting a correction example of the sampling period variation in FIG. 20.

FIG. 21 and FIG. 22 shows the state before and after correcting the sampling period difference. In FIG. 21 and FIG. 22, the signal on top is an index signal, in other words, the period of this signal is one cycle. The signal in the middle shows the time difference from the servo gates. And the signal below shows a signal for correcting the servo gate generation time.

As FIG. 21 shows, when the sampling period difference is not corrected, the servo signal fluctuates in a sine wave in one track, as the time variation signal shows. By measuring this variation and adjusting the generation time of the servo gates, the sampling period difference can be solved, as FIG. 22 shows.

Figure 23:
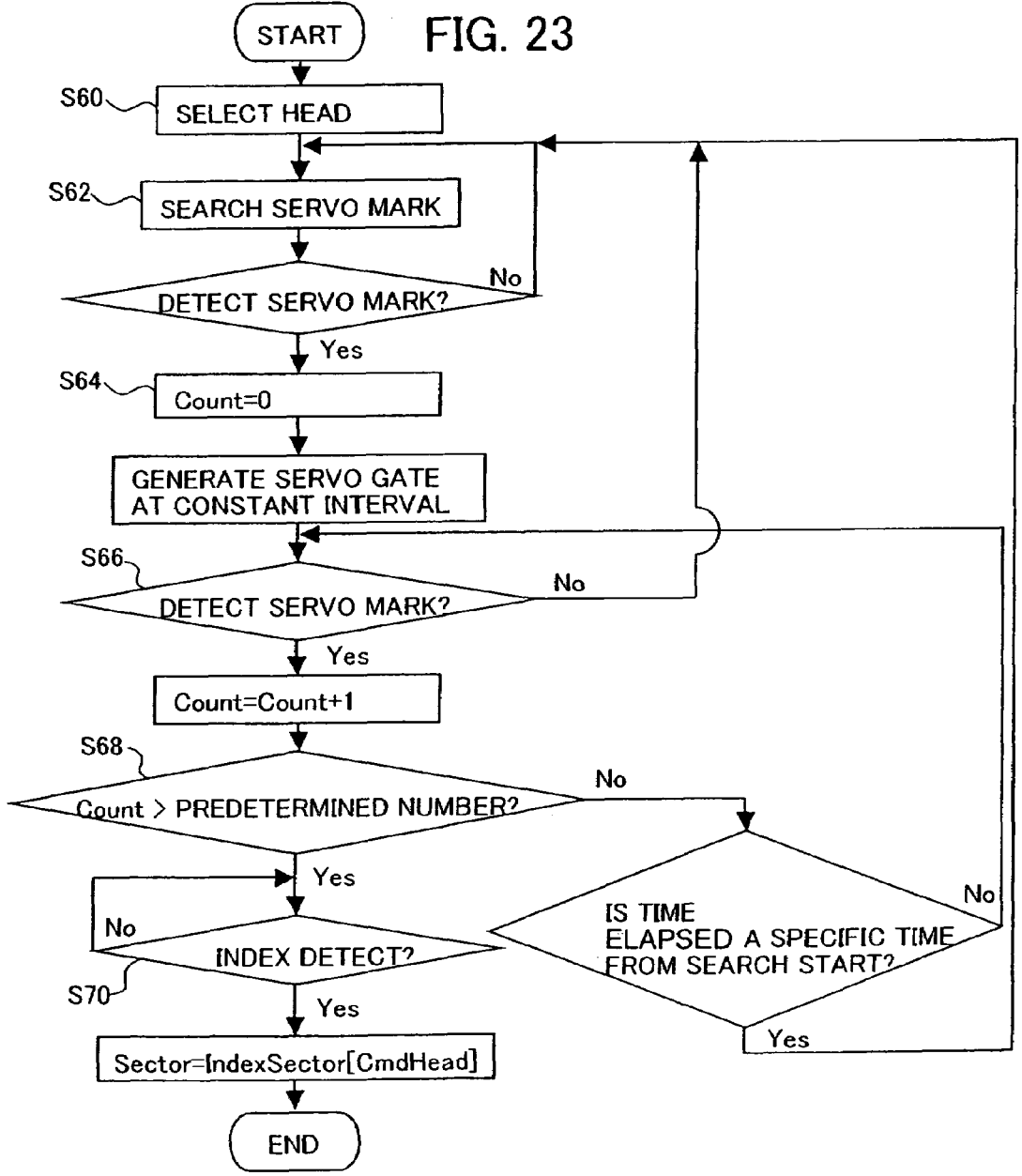
FIG. 23 is a flow chart depicting the index synchronization processing of the first embodiment of the present invention.

Now the index synchronization processing after loading the actuator will be described with reference to FIG. 23. This example shows the processing after the sector difference amount has already been stored in the memory.

(S60) The head to be used is selected.

(S62) The servo marks are searched from the output of the head.

(S64) When a servo mark is detected, the confirmed count value Count is initialized to "0". And the servo gates are supplied to the signal demodulation section 40 at a predetermined interval Ts.

(S66) It is judged whether a servo mark was detected by the servo gate. If not detected, processing returns to step S62. If a servo mark was detected, the confirmed count value Count is incremented by "1".

(S68) It is judged whether the confirmed count value Count exceeded the specified number of times of confirmation. If not exceeded the specified number of times, it is judged whether the specified time or more has elapsed from the servo mark searching. If the specified time or more has elapsed, processing returns to step S62. If the specified time or more has not elapsed, processing returns to step S66.

(S70) If the measured count value exceeded the specified number of times, it is judged whether the index was detected. If the index was detected, the index difference amount of the head is read from the table 54, and is loaded to the sector counter 52. By this, index synchronization processing ends.

When the power is turned ON, the disk 10 is rotated until reaching a specified rotation frequency by the motor 18.

Then a specified head is positioned on the track. If the difference amount for each individual device has been stored in the non-volatile memory on the electronic circuit, the servo sector number is not initialized to "0" when the index pulse is detected, instead the value of the difference amount thereof is copied.

Thereafter each time a servo signal is detected, the sector number is incremented by "1". If an index pulse is detected, the sector number is initialized based on the difference value thereof. The sector number is initialized to "0" if the number of sectors of one track is reached.

Electronic circuits are common for each device, and operate as follows if the information on the difference amount is stored on the disk. First the servo signals are detected, and when the index pulse is detected, the servo sector number is set to "0". Hereafter, the servo sector number is incremented by "1" each time a servo signal is detected, and when the value reaches the number of sectors for one track, or when the index pulse is detected, the servo sector number is cleared to "0".

Then the actuator is positioned at the radius position with a same track number for all the individual devices. And the data written on the disk is read. Various difference amounts are recorded in this data. The sector difference is set using the values of these difference amounts. At this time, the sector number when the index pulse is generated is changed depending on the head.

Figure 24:
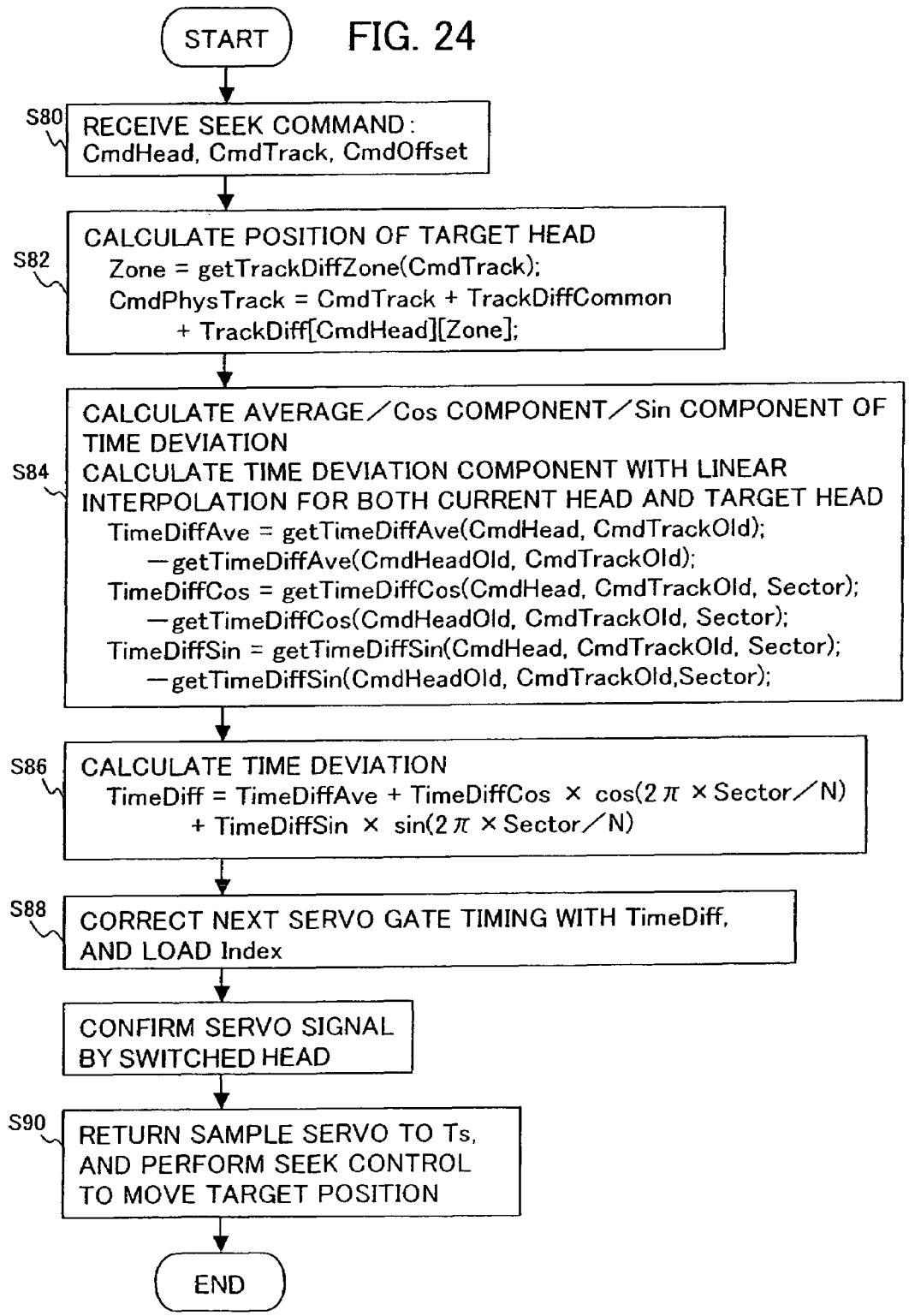
FIG. 24 is a flow chart depicting the head switching processing of the first embodiment of the present invention.

Now the time difference correction processing when the heads are switched will be described with reference to the processing flow in FIG. 24.

(S80) A seek command is received. The seek command includes the target head CmdHead, target track CmdTrack, and offset CmdOffset.

(S82) The position of the target head is calculated. The zone Zone is determined from the target track number. Also the physical track number is calculated with the disk of the head using the later mentioned track number correction value (TrackDiffCommon and TrackDiff for each zone and head) in the radius direction, and CmdTrack.

(S84) Now the difference of the time difference information between two heads (current head and target head) is determined. The time difference information is stored as the average value, Cos component, and Sin component. The table 62 is referred to by the current head number CmdHeadOld, target head number CmdHead, and current position CmdTrackOld, linear interpolation is performed, and the average value, Cos component and Sin component at this position are determined. These values are determined for two types: for a current head and for a head to switch to. These values show the relative difference viewed from a specified head during measurement. Therefore the difference amount of the two heads can be determined by determining the difference of these values.

(S86) In this way, the difference values of the average value, Cos component and Sin component near the track between two heads can be determined. Using these three values, the time difference at that time, that is at the current sector number, is determined. For this, the following formula is calculated where the current sector number is k and the number of sectors of one track is N.

$$TimeDiff = \text{difference of average values} +$$
$$(\text{difference of Cos components}) \times \cos(2\pi k/N) +$$
$$(\text{difference of Sin components}) \times \sin(2\pi k/N)$$

The problem is the difference time, which is the result of this calculation. Normally a program of a micro controller 28 on a circuit of a device performs such an operation. Some processing time is required for this. If the calculation result is too short, processing cannot catch up. Therefore time for one sampling must be added. It is also necessary to increment the servo sector number by "1" at this time.

(S88) The difference time is determined in this way, and the servo gate generation time is corrected according to this determined time. Servo sector numbers, which are continuous, do not change. However, for the signals recorded on the disk, the relationship of the difference between the servo sector number in the program and the servo signal on the disk is different, depending on the individual device. Therefore when processing for synchronizing with the sector number is performed, sector number and servo signal are corresponded so that a specified sector is detected when the index pulse is generated. And the switched head confirms the servo signal with this servo gate.

(S90) After this confirmation, the servo sampling period is returned to the original Ts, seek control is performed, and the head is moved to the target track. When the head is following the target track, the servo sampling interval is corrected using the time difference correction table 64 where the measurement result in FIG. 16 is stored.

Figure 25:
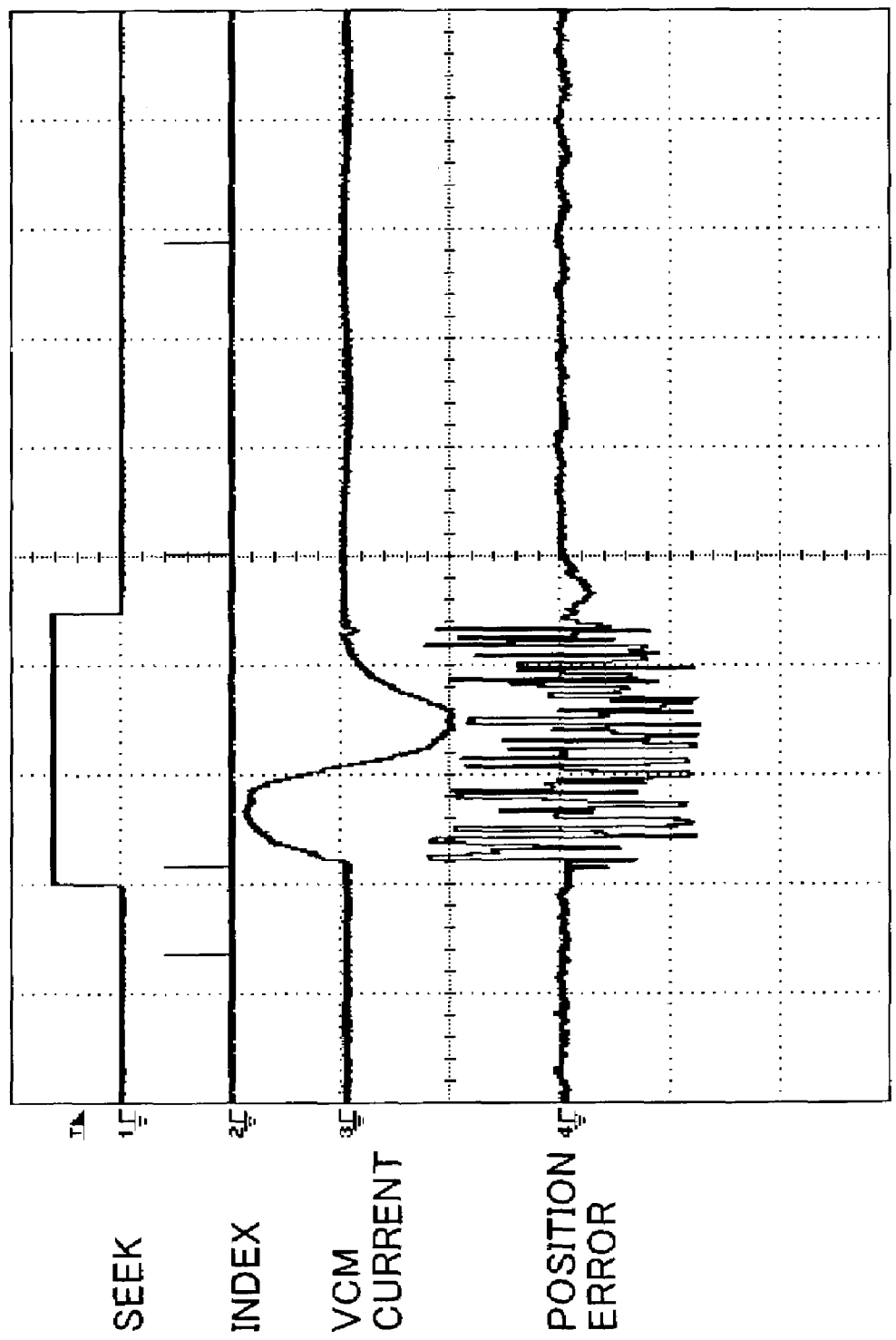
FIG. 25 is a diagram depicting an example of the seek operation by head switching in FIG. 24.

FIG. 25 shows an example of the seek response. This is an example of a device where two disks, where single disk STW has been completed, are mounted on a 2.5 inch hard disk drive, heads are switched, and seek is performed between the disks.

The two disks are intentionally shifted from each other for about ¼ of a track. In this example, the detected index signals are directly output. Therefore the interval of the index signals changes between before and after switching the heads (before and after seek), but the correspondence of the index signal and the sector number is changed depending on the head. Therefore accurate seeking can be performed even if the heads are switched.

[Difference Correction Method in Radius Direction]

Now a method for correcting displacement in the radius direction, that is the difference of the track number between the heads, will be described. For this track displacement in the radius direction, problems and methods of the solution are described in detail in Japanese Patent Laid-Open No. 2001-266454, "Head positioning control method for disk device and disk device".

Figure 27:
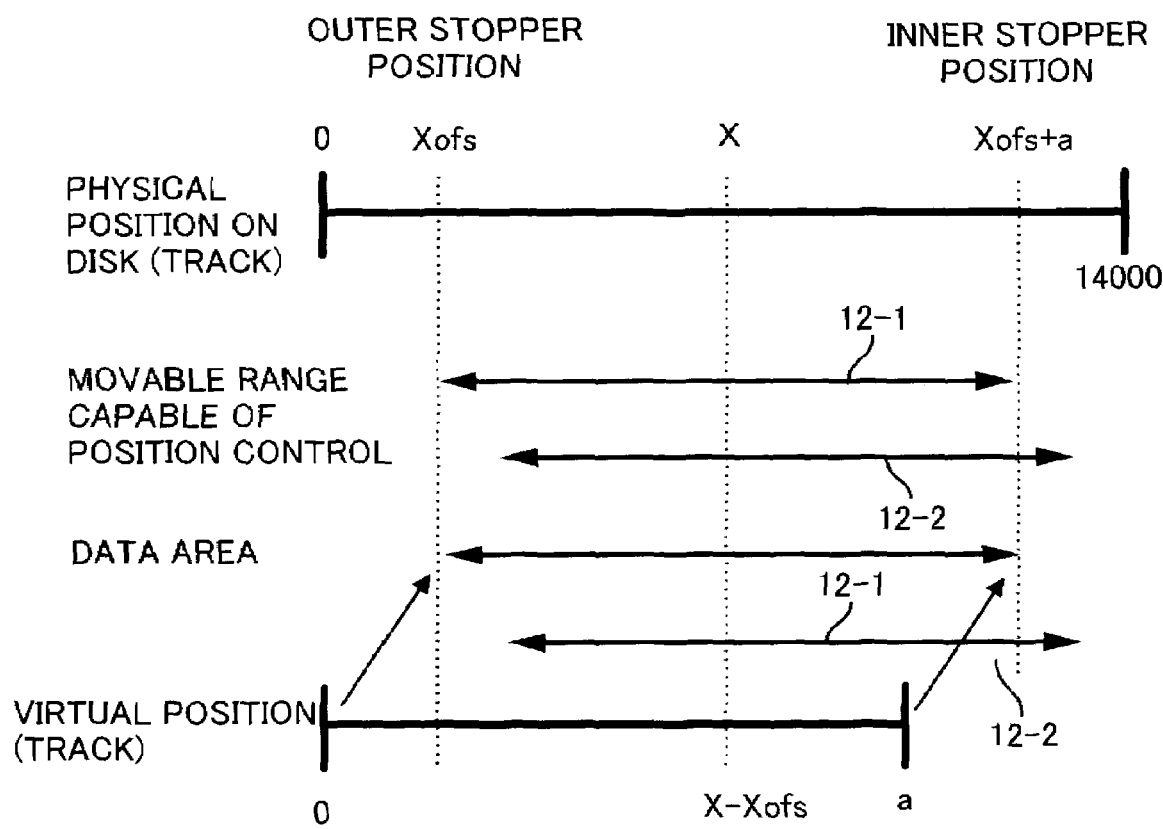
FIG. 27 is a diagram depicting the displacement in the radius direction in FIG. 26.
Figure 28:
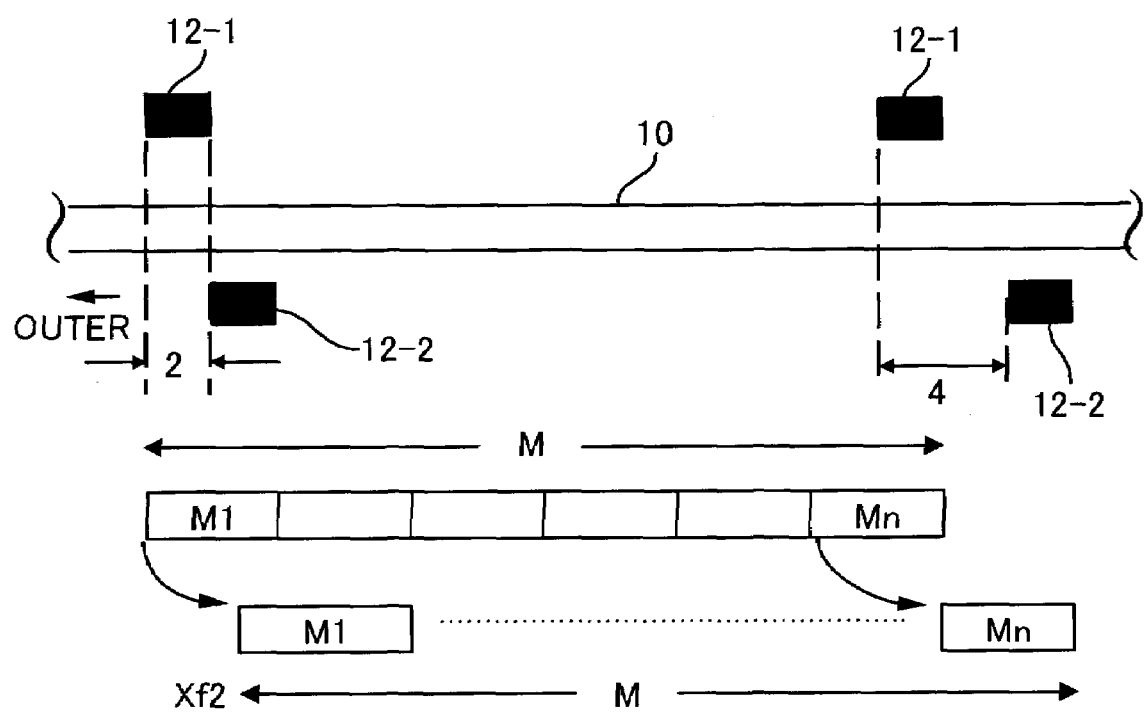
FIG. 28 is a diagram depicting the displacement in the radius direction between heads in FIG. 27.

This will be described with reference to FIG. 27 to FIG. 30. As FIG. 28 shows, there is a displacement in the radius direction between the heads 12-1 and 12-2 with respect to the disk 10. And the displacement amount differs depending on the individual device. Also, as FIG. 27 shows, with respect to the physical position (track) range, 0–14000, on the disk 10, the data area in the movable range of the actuator (VCM) is limited by the eccentricity of the disk 10. Also as FIG. 27 and FIG. 28 show, the data area differs between the heads because of the displacement in the radius direction between the heads 12-1 and 12-2.

Because of the difference of the displacement amount in the radius direction between the heads depending on the individual device, the seek time for recording/regenerating data, particularly the seek time when the heads are switched, differs depending on the individual device. This means that the data recording/regeneration time differs depending on the individual device.

To decrease this time, the moving distance when the heads are switched is decreased. For this, the above mentioned patent laid open proposes that the displacement amount between the heads is stored, and the track number instructed from the outside is converted by the positioning control device.

As FIG. 28 shows, if a rotary actuator is used for moving the head in this case, the displacement amount between the heads at an outer track ("2" in this case) is different from the displacement amount of the heads at an inner track ("4" in this case).

Therefore the displacement amount between the heads cannot be uniquely determined in the entire data area. So as FIG. 28 shows, the data area M is divided into a plurality of areas (zones) M1–Mn, and the start position of each area is stored as the difference. Also this start position is specified by the displacement amount (offset) between the heads, so one of the heads is set as a reference head, and the other head is defined as the displacement amount from the reference head.

Figure 29:
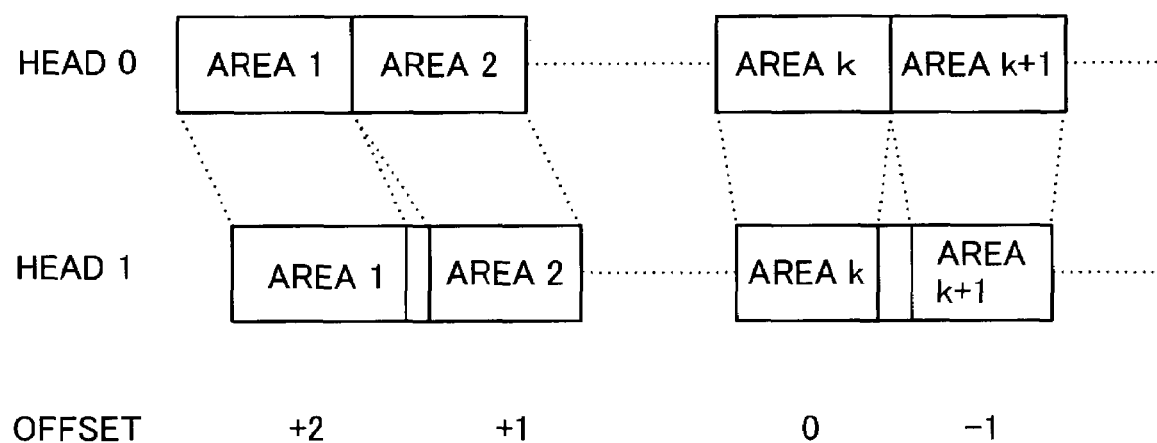
FIG. 29 is a diagram depicting the zone assignment in FIG. 28.
Figure 30:
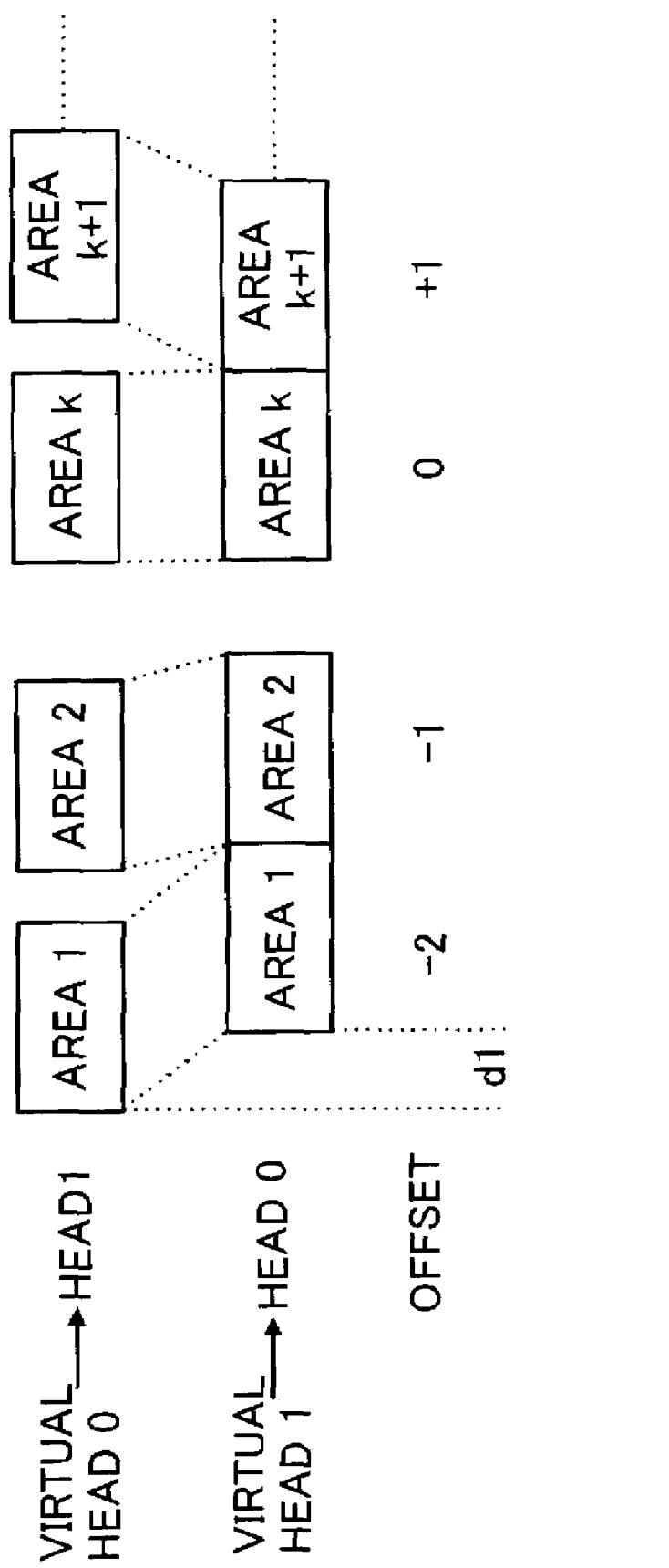
FIG. 30 is a diagram depicting the reference head in FIG. 28.

If the displacement amount of each area of the head 1 decreases when the head 0 is the reference head, as shown in FIG. 29, redundancy occurs if the track numbers are converted. However, even in the above mentioned invention, a problem occurs if the device has a plurality of disks. Therefore, as FIG. 30 shows, the head 1 is set as a reference head, so that the displacement amount of the area increases, and the displacement amount of the head 0, from the head 1, is stored.

The above mentioned proposal disclosed that the displacement of the heads between the front and back of a disk is stored and is used for conversion, where it is assumed that the displacement amount is the same, even if a plurality of disks are used. With this, however, the displacement between the disks is not considered, so the seek time differs depending on the individual device for the amount displaced between the disks.

To prevent this problem, in the present invention, the displacement between each head of the plurality of disks is measured, a reference head whereby the displacement amount of the other heads simply increase is determined, and the displacement amount of the other heads from the reference head is stored. A specific method thereof will now be described with reference to FIG. 31 to FIG. 33.

First the movable range is checked for all the heads. This value is different depending on the head. And a common track number shift amount, for converting the track number instructed from the host device, is determined for all the heads in common, so that the data area can enter the movable range for each individual head. To determine this movable range, the range of the track numbers that can be detected is determined, while actually moving the actuator to the movable limit.

Then a temporal measurement reference head is determined. This can be an arbitrary head. When there are four heads, 0, 1, 2 and 3, for example, 0 is assumed to be the reference head.

Figure 31:
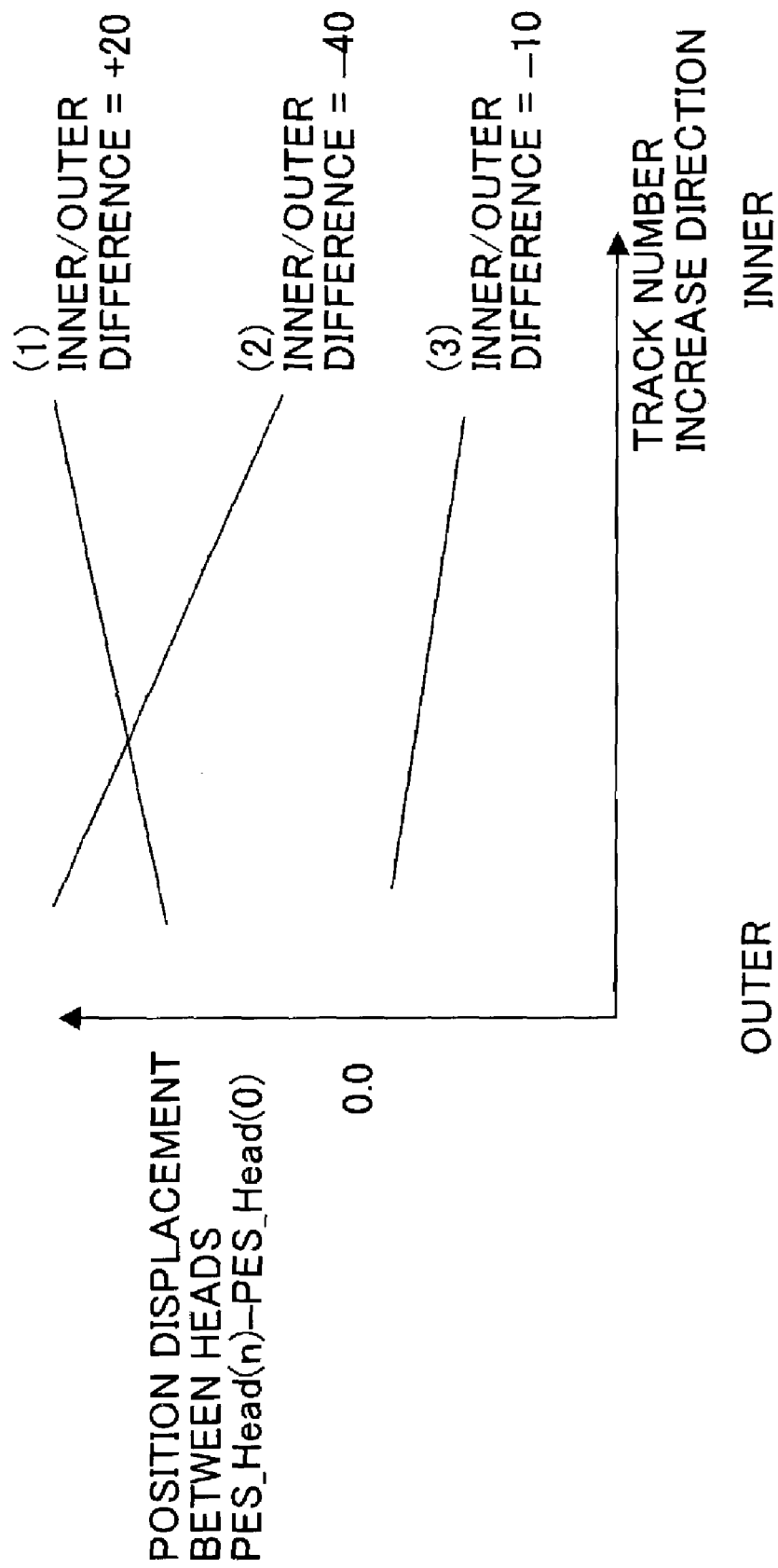
FIG. 31 is a diagram depicting the reference head selection processing in FIG. 28.

Then the displacement of the other heads, 1, 2 and 3, when viewed from the head 0, which is the reference head, are determined. For this, the head 0 is positioned at an outer track section of the disk. Then the head 0 is switched to another head, and the displacement is measured. Then the head 0 is positioned at an inner track section of the disk. And in the same way, the head 0 is switched to another head, and the displacement is measured. Here, as FIG. 31 shows, two displacements, an outer track section and an inner track section, are determined for each head 1, 2 and 3, when the head 0 is a temporal reference.

The difference values of the displacements are determined. These difference values are analyzed as follows. If all the difference values of the displacements are positive or 0 with the track number increasing direction as a reference, then the temporal reference head is determined to be the true reference head.

If at least one negative value is included in all the difference values of the displacements with the track number increasing direction as a reference, then the head which shows the smallest value of the displacement (largest negative inclination) is determined to be the reference head. In FIG. 31 the head 2 becomes the reference head.

Such an operation is performed because when the track number is converted, an overlapping area must not be generated in the zone of the value to be converted, as described in FIG. 29 and FIG. 30. For this, the difference amount of the track numbers must be increased in the positive direction, which is the track number increasing direction.

Figure 32:
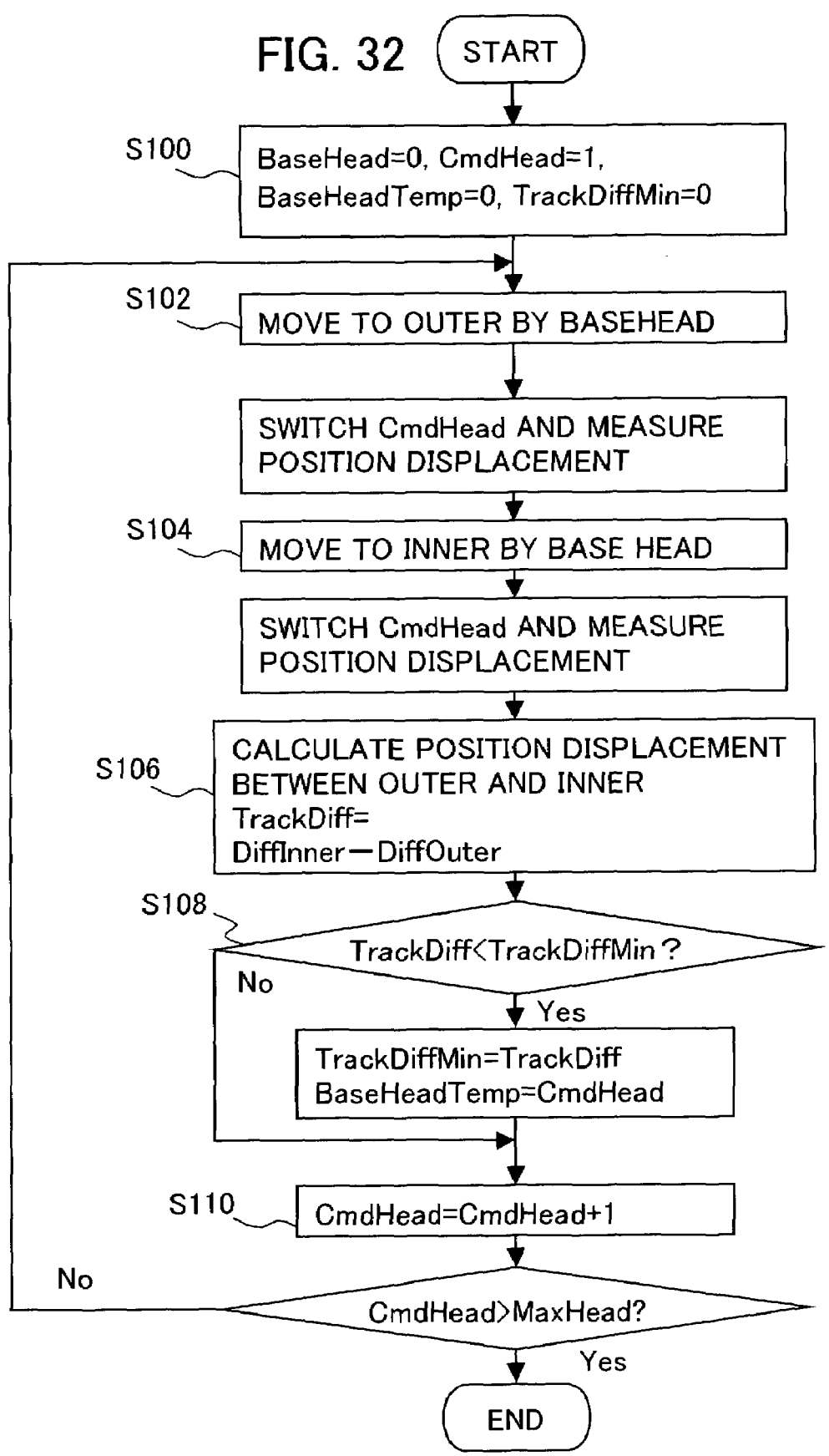
FIG. 32 is a flow chart depicting the reference head selection processing in FIG. 31.

This processing will be described with the flow chart depicting the reference head decision processing in FIG. 32.

(S100) The reference head number BaseHead is initialized to "0", temporary reference head number BaseHeadTemp to "0", and the track number difference minimum value TrackDiffMin to "0". And the measurement target head number CmdHead is set to "1".

(S102) The reference head is moved to an outer track, switched to the measurement head, the track number is read, and the displacement at the outer track DiffOuter is measured.

(S104) The reference head is moved to an inner track, switched to the measurement head, the track number is read, and the displacement at the inner track DiffInner is measured.

(S106) The displacement of the inner and outer tracks TrackDiff of this measurement head is calculated by (inner track displacement−outer track displacement).

(S108) It is judged whether the displacement of the inner and outer tracks determined in step S106 is smaller than the minimum value of the track number displacement. If smaller, the displacement of the inner and outer tracks TrackDiff of the measurement head is set to the track number difference minimum value TrackDiffMin, and this measured head number is set to the temporal reference head.

(S110) The measured head number is incremented by "1". And it is judged whether the incremented measurement head number exceeded the maximum head number of the device. If not exceeded, processing returns to step S102, and if exceeded, decision processing ends.

After determining the reference head in this way, the displacement is measured for each zone. For example, the area is divided into 8 zones or 16 zones, and the displacement from the reference head to another head is determined for an individual zone. It is easier if this zone is determined such that the track numbers have an equal interval. If there is an area where the curve of the change of values is sharp, then the range of each zone may be set small around the area.

Figure 33:
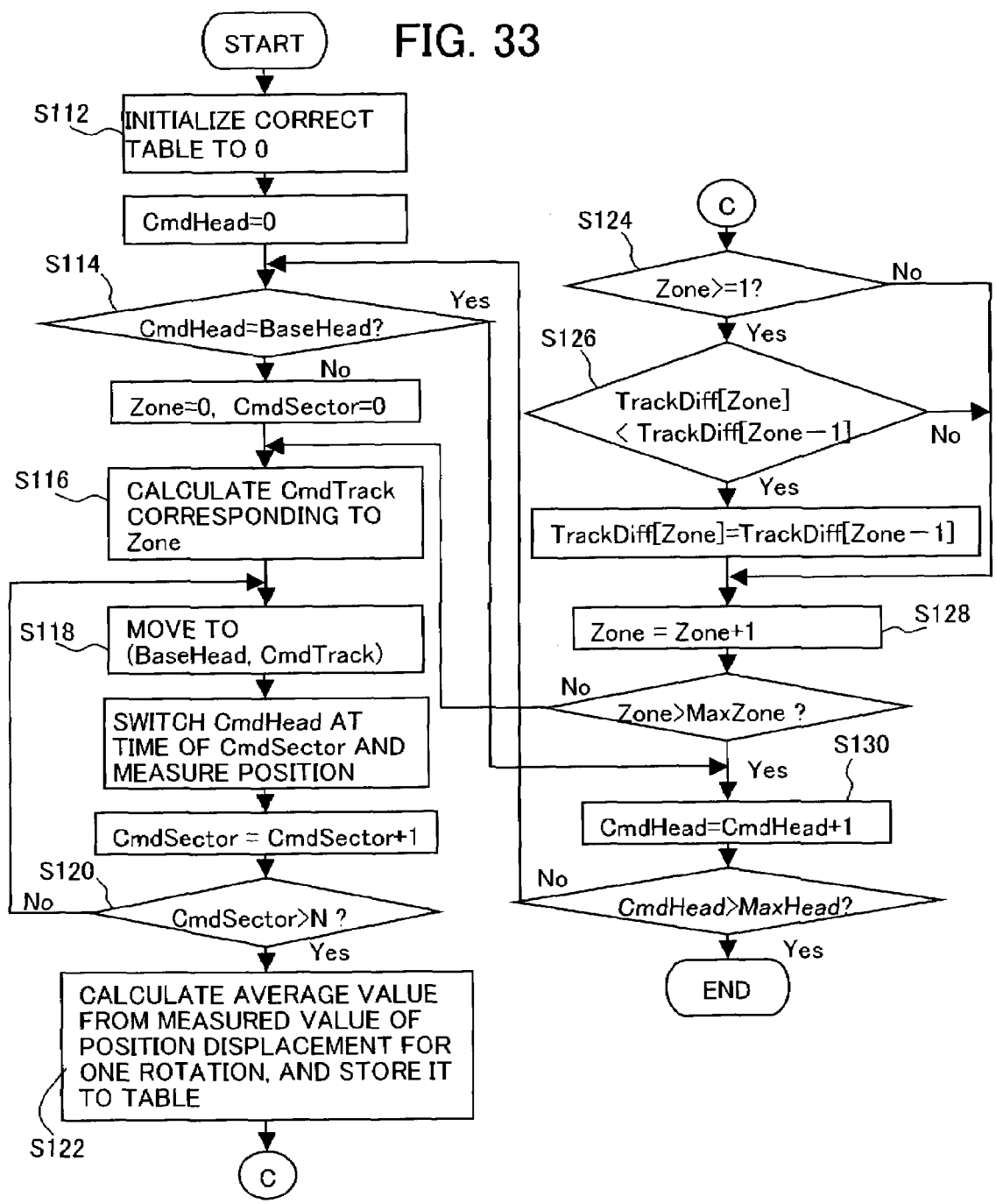
FIG. 33 is a flow chart depicting the measurement processing of the displacement in the radius direction of the second embodiment of the present invention.
Figure 36:
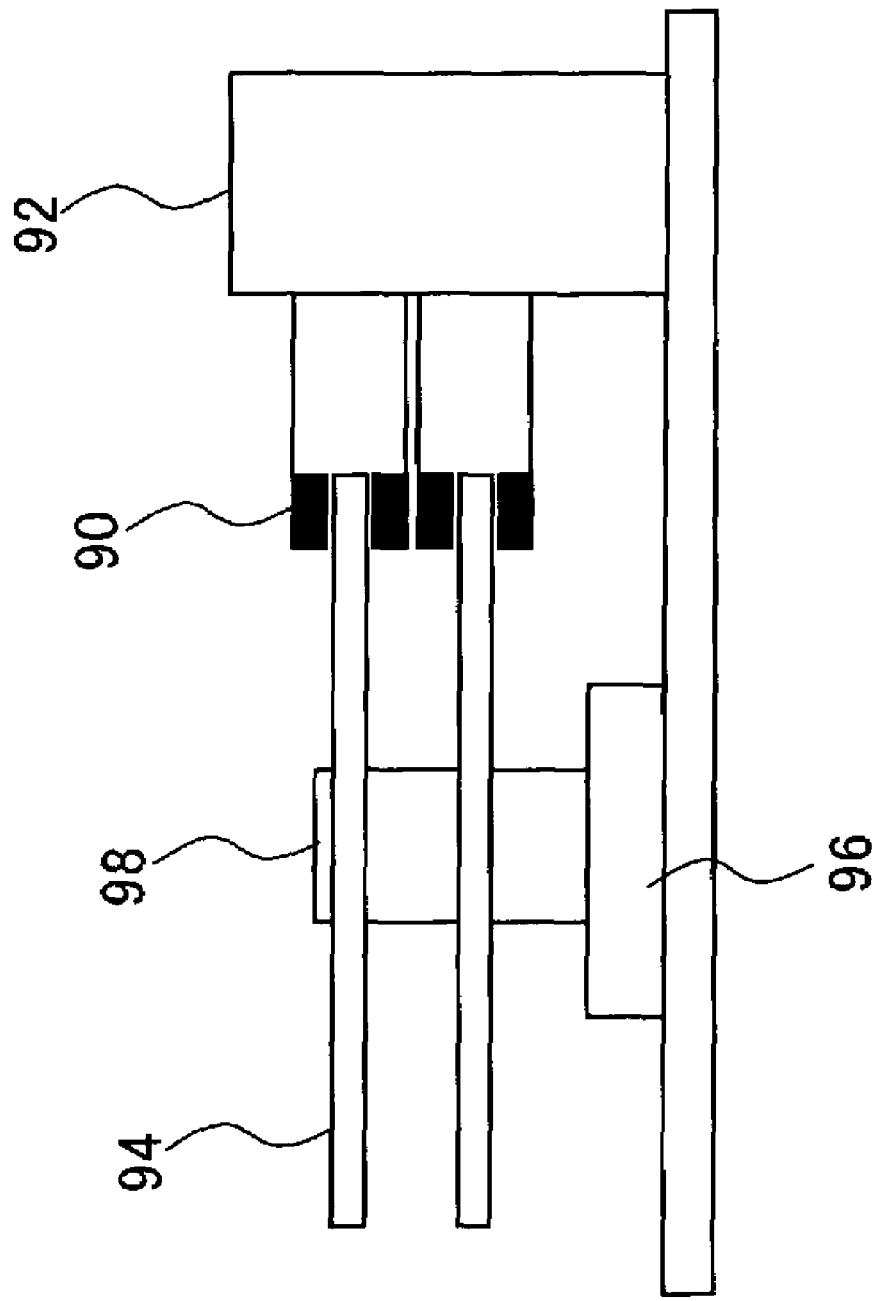
FIG. 36 is a diagram depicting a conventional magnetic disk device.
Figure 37:
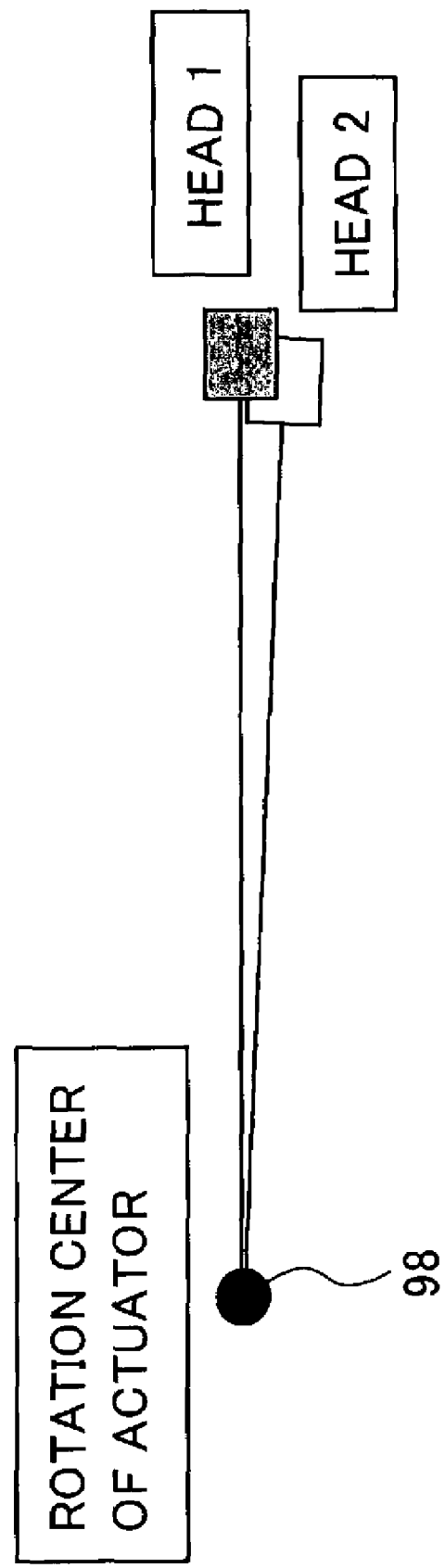
FIG. 37 is a diagram depicting the displacement between heads of the magnetic disk device.
Figure 38:
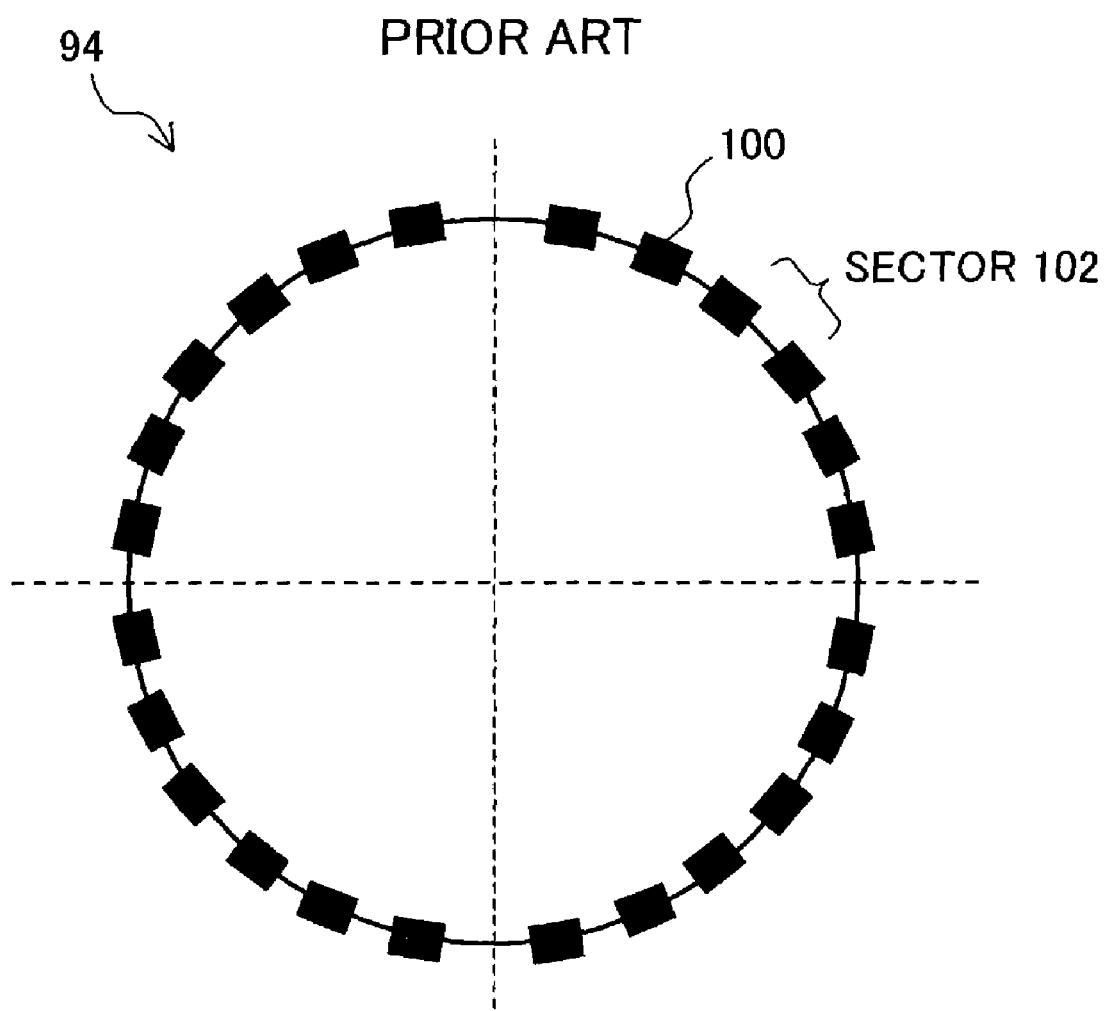
FIG. 38 is a diagram depicting the position signals in FIG. 36.
Figure 39:
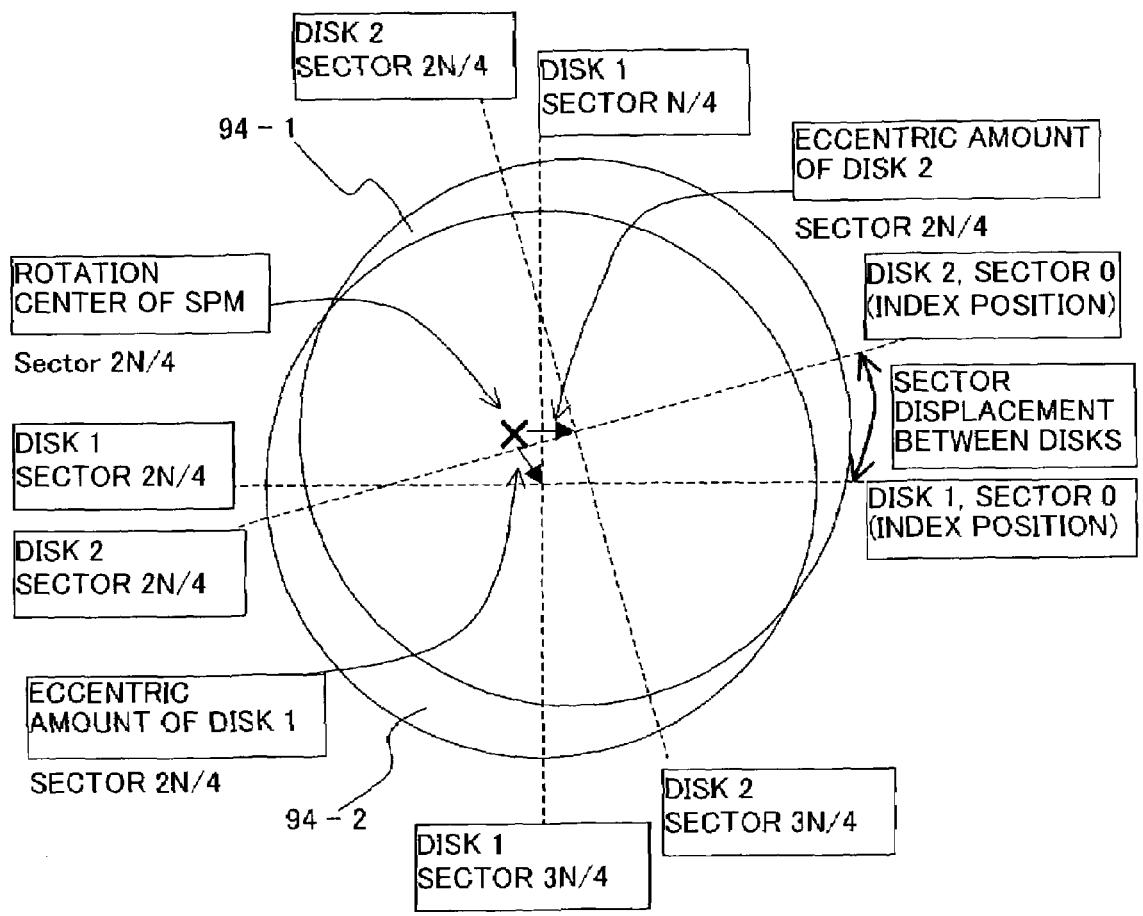
FIG. 39 is a diagram depicting the displacement in the circumference direction and the radius direction between disks in FIG. 36.

FIG. 33 is a flow chart depicting the measurement processing of the displacement in the radius direction.

(S112) The correction table 46 (see FIG. 26) is initialized to "0". Then the target head CmdHead is initialized to "0".

(S114) It is judged whether the target head is the reference head BaseHead. If the target head is the reference head, processing advances to the target head change step in step S130. If the target head is not the reference head, the measurement target zone Zone is initialized to "0", and the target sector CmdSector when the heads are switched is initialized to "0".

(S116) The target (measurement) track corresponding to this zone Zone is set.

(S118) The VCM is moved so that the reference head is positioned on the target track. At the time when the reference head detects the target sector, the head is switched to the target head, and the position (track number) in the radius direction is measured. Then the target sector CmdSector is incremented by "1".

(S120) It is judged whether the target sector exceeded the maximum value N of the number of sectors in one track. If not exceeded, processing returns to step S118.

(S122) If the target sector exceeded the maximum value N, on the other hand, the measurement of one track is over, and an average value of the displacement values for one track is calculated, and the result is stored for the track number shift amount of the corresponding head number and zone number of the correction table 46 in FIG. 26.

(S124) Then it is judged whether the measurement target zone is zero. This means that it is judged whether the measurement target zone is "1" or more. If not "1" or more, that is if it is "0", processing advances to step S128.

(S126) If the measurement target zone is "1" or more, then it is judged whether the track number shift amount TrackDiff [Zone] of the zone this time is smaller than the track number shift amount TrackDiff [Zone −1] of the zone the previous time. If smaller, the track number shift amount TrackDiff [Zone −1] of the zone the previous time is set for the track number shift amount TrackDiff [Zone] of the zone this time, and the table 46 is rewritten.

(S128) The measurement target zone is incremented by "1". And it is judged whether the measurement target zone exceeded the maximum zone MaxZone of the disk. If not exceeded, processing returns to step S116.

(S130) If the measurement zone exceeded the maximum zone, the next head becomes the target, so the target head is incremented by "1". And it is judged whether the target head number exceeded the maximum head number of the device. If not exceeded, processing returns to step S114. Whereas if exceeded, the track number shift amount of each zone of all the heads with respect to the reference head have been measured, so processing ends.

The track number conversion method using this table 26 is as follows.

$$\begin{aligned}\text{Track number after conversion} =\\ \text{(instructed track number} + \text{common track number shift amount of}\\ \text{reference head} + \text{offset (shift amount) of target head for each zone)}\end{aligned}$$

As FIG. 26 shows, the memory area of the table 46 is prepared for all the heads in advance. By this, the configuration of the above formula can be used. Therefore the offset amount of the reference head for each zone is "0".

As described above, by expanding the measurement method so that measurement only between heads is performed without using the concept "between disks", track numbers can be effectively converted even in a device where a plurality of disks are mounted. In other words, when the track number is the same and only the head number is different, the distance for the actuator moves, that is the seek distance can be minimized.

FIG. 34 and FIG. 35 show measurement results of the displacement in the radius direction between heads. A 2.5 inch hard disk was used for the experiment. In the examples in FIG. 34 and FIG. 35, the head 1 is the reference head. Therefore as FIG. 34 shows, the value of the head 1 is "0". The other head, on the other hand, is displaced. As FIG. 34 and FIG. 35 show, all the measurement results exhibit positive inclination when the direction where the track numbers increase is a positive direction.

Such a correction table 26 can be stored in a non-volatile memory, such as ROM, on the circuit substrate of the device, or on a disk. When the correction table 26 is stored in the ROM, the area is referred to when using the correction table. On the disk, the range of the track numbers where the head can be moved is different depending on the head and depending on the individual device, as mentioned above. So as FIG. 19 shows, information is stored in an accessible range for all the devices, such as tracks around the center of the disk, considering the variation of the individual device. The track number is common for all the individual devices. This area is accessed immediately after power is turned ON, and information is read and developed into the volatile memory area on the circuit.

Other Embodiments

The disk storage device has been described using a magnetic disk device, but can be applied to other disk storage devices, such as an optical disk device and magneto-optical disk device. The correction method for displacement in the circumference direction can be applied between the heads for the front and back of one disk, and is not limited to two or more disks. The disk shape is not limited to a disk, but may be a card.

The present invention was described with the embodiments, but various modifications are possible within the scope of the essential character of the present invention, and these variant forms shall not be excluded from the technical scope of the present invention.

As described above, the following effects are implemented according to the present invention.

(1) Since the sector numbers on the disk are converted for each head to deal with the displacement in the circumference direction, positions in the circumference direction can be aligned for each individual device, the difference of the individual device can be solved, and performance can be improved.

(2) Since the servo gate time is corrected according to the eccentricity of the disk, signals can be accurately detected, and servo signal detection accuracy improves.

(3) Since the track numbers on the disk are converted with the displaced value based on the reference head to handle the displacement in the radius direction, positions in the radius direction can be aligned for each individual device, the difference of the individual device can be solved, and performance can be improved.

What is claimed:

1. A head position control method for a disk device which has a plurality of heads for at least reading different faces of disks where servo signals for detecting the position of a head are recorded, comprising:
   a step of switching from a first head for reading from a first disk face to a second head for reading from a second disk face;
   a step of extracting a signal indicating a start position in the circumference direction of said second disk face from servo signals read by said second head;
   a step of extracting a sector number shift value of said second head relative to a sector number shift value of said first head from a plurality of sector number shift values set for each one of said plurality of heads; and
   a step of generating a plurality of sector numbers in a track of said second disk face corresponding to said second head from said signal indicating the start position and said extracted sector number shift value of said second head.

2. The head position control method according to claim 1, wherein said generation step comprises a step of generating a sector number by adding said signal indicating the position and said extracted sector number shift value.

3. The head position control method according to claim 1, wherein said generation step comprises a step of generating the sector numbers of one track of said disk based on one or a plurality of index signals of said servo signals, with said sector number shift value used as an initial value.

4. The head position control method according to claim 3, further comprising a step of judging synchronization with signals of said disk by comparing said generated sector number and said sector number shift value according to said index signal.

5. The head position control method according to claim 1, further comprising a step of setting the sector number shift value of said second head corresponding to the second disk face, where said sector number shift value for each one of said heads is recorded, to zero.

6. The head position control method according to claim 3, further comprising a step of measuring the sector number shift values for each one of said heads according to the positions of said index signals before and after switching said heads.

7. A head position control method for a disk device which has a plurality of heads for at least reading the different faces of a disk where servo signals for detecting the position of the head are recorded, comprising:
   a step of calculating the time difference value in the circumference direction of said servo signals between said heads from said sector position where said heads are switched when one, first head of said plurality of heads is switched to another, second head; and
   a step of correcting the time of servo gate signals for extracting said servo signals by the time difference value;
   wherein said calculation step comprises a step of calculating said time difference value from the time difference information indicated by a sine wave with a same frequency as the rotation frequency of said disk.

8. A head position control method for a disk device which has a plurality of heads for at least reading the different faces of a disk where servo signals for detecting the position of the head are recorded, comprising:
   a step of calculating the time difference value in the circumference direction of said servo signals between said heads from said sector position where said heads are switched when one, first head of said plurality of heads is switched to another, second head; and
   a step of correcting the time of servo gate signals for extracting said servo signals by the time difference value;
   wherein said calculation step comprises a step of calculating said time difference value from the average value of said time difference, and the time difference information indicated by a sine wave and cosine wave with a same frequency as the rotation frequency of said disk.

9. A head position control method for a disk device which has a plurality of heads for at least reading the different faces of a disk where servo signals for detecting the position of the head are recorded, comprising:
- a step of calculating the time difference value in the circumference direction of said servo signals between said heads from said sector position where said heads are switched when one, first head of said plurality of heads is switched to another, second head;
- a step of correcting the time of servo gate signals for extracting said servo signals by the time difference value; and
- a step of adjusting said servo gate generation time by a measurement value obtained by measuring the time variation of said servo signals of each one of said heads.

10. A head position control method for a disk device which has a plurality of disks where servo signals for detecting the position of the head are recorded, comprising:
- a step of extracting the displacement amount of a second head in a radius direction from a table which stores the displacement amount of said second head relative to a displacement amount of a first head of a plurality of heads, wherein the displacement in the radius direction of said disks between said first head and said second head increases in a positive direction of a track number increasing direction when a head is switched to said second head;
- a step of converting a track number given for said second head by using said extracted displacement amount; and
- a step of controlling an actuator for driving said second head by the converted track number.

11. The head position control method according to claim 10, further comprising a step of measuring the displacement amount in the radius direction of said disk of said second head with respect to said first head in said track number increasing direction based on said first head, and a step of determining said head where the displacement in the radius direction of said disk increases in the positive direction of said track number increasing direction to the reference head based on said measured displacement amount.

12. A disk device which has a plurality of heads for at least reading different faces of disks where servo signals for detecting the position of the head are recorded, comprising:
- a table for storing sector number shift values which are set for each one of said plurality of heads; and
- a sector number generation section for generating a plurality of sector numbers in a track of a disk face corresponding to a second head by extracting a sector number shift relative to a sector number shift value of a first head, from said table value of said second head when a switch is made from a first head to said second head, and correcting the signals indicating a start position of said disk face in the circumference direction which are included in servo signals read by said second head with said extracted sector number shift value.

13. The disk device according to claim 12, wherein said generation section generates a sector number by adding said signal indicating the position and said extracted sector number shift value.

14. The disk device according to claim 12, wherein said generation section generates sector numbers of one track of said disk based on one or a plurality of index signals of said servo signals, with said sector number shift value used as an initial value.

15. The disk device according to claim 14, further comprising a synchronization judgment section for judging synchronization with signals of said disk by comparing said generated sector number and said sector number shift value according to said index signal.

16. The disk device according to claim 12, wherein the sector number shift value of said second head corresponding to the second disk face, where said sector number shift value for each one of said heads is recorded, is set to zero.

17. The disk device according to claim 14, further comprising a control section for measuring the sector number shift value for each one of said heads according to the positions of said index signals before and after switching said head.

18. A disk device which has a plurality of heads for at least reading the different faces of a disk where servo signals for detecting the position of the head are recorded, comprising:
- a signal demodulation section for extracting said servo signals from read signals of the head by a servo gate; and
- a servo gate generation section for calculating the time difference value in the circumference direction of said servo signals between said heads from the sector position of one, first head when one, first head of said plurality of heads is switched to another, second head, and correcting the time of servo gate signals for extracting said servo signals by the time difference value
  wherein said servo gate generation section calculates said time difference value from the time difference information indicated by a sine wave with a same frequency as the rotation frequency of said disk.

19. A disk device which has a plurality of heads for at least reading the different faces of a disk where servo signals for detecting the position of the head are recorded, comprising:
- a signal demodulation section for extracting said servo signals from read signals of the head by a servo gate; and
- a servo gate generation section for calculating the time difference value in the circumference direction of said servo signals between said heads from the sector position of one, first head when one, first head of said plurality of heads is switched to another, second head, and correcting the time of servo gate signals for extracting said servo signals by the time difference value;
  wherein said servo gate generation section calculates said time difference value from the average value of said time difference, and the time difference information indicated by a sine wave and cosine wave with a same frequency as the rotation frequency of said disk.

20. A disk device which has a plurality of heads for at least reading the different faces of a disk where servo signals for detecting the position of the head are recorded, comprising:
- a signal demodulation section for extracting said servo signals from read signals of the head by a servo gate; and
- a servo gate generation section for calculating the time difference value in the circumference direction of said servo signals between said heads from the sector position of one, first head when one, first head of said plurality of heads is switched to another, second head, and correcting the time of servo gate signals for extracting said servo signals by the time difference value;
  wherein said servo gate generation section adjusts said servo gate generation time by a measured value obtained by measuring the time variation of said servo signals of each one of said heads.

21. A disk device which has a plurality of disks where servo signals for detecting the position of a head are recorded, comprising:

a table for storing a displacement amount in the radius direction of a second head relative to a displacement amount of a first head of a plurality of heads, wherein the displacement in the radius direction of said disk between said first head and said second head increases in the positive direction of a track number increasing direction;

a track number conversion section for extracting, the displacement amount of said second head in the radius direction of said disk from said table when said first head is switched to said second head and converting a track number given for said second head by using said extracted displacement amount; and control section for controlling an actuator for driving said second head with the converted track number.

22. The disk device according to claim 21, wherein said control section measures the displacement amount in the radius direction of said disk of said second head with respect to said first head in said track number increasing direction based on said first head, and determining said head where the displacement in the radius direction of said disk increases in the positive direction of said track number increasing direction to the reference head based on said measured displacement amount.

* * * * *